(12) United States Patent
Yasaki et al.

(10) Patent No.: US 9,750,067 B2
(45) Date of Patent: Aug. 29, 2017

(54) COMMUNICATION METHOD, INFORMATION PROCESSING APPARATUS, AND NON-TRANSITORY COMPUTER-READABLE RECORDING MEDIUM

(71) Applicant: FUJITSU LIMITED, Kawasaki-shi, Kanagawa (JP)

(72) Inventors: Koichi Yasaki, Kawasaki (JP); Kazuaki Nimura, Kawasaki (JP); Hidenobu Ito, Kawasaki (JP); Takuya Sakamoto, Kawasaki (JP); Junya Kani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/049,589

(22) Filed: Feb. 22, 2016

(65) Prior Publication Data
US 2016/0286591 A1    Sep. 29, 2016

(30) Foreign Application Priority Data
Mar. 26, 2015  (JP) ................................ 2015-065088

(51) Int. Cl.
*H04B 7/15*    (2006.01)
*H04W 76/02*   (2009.01)
(Continued)

(52) U.S. Cl.
CPC ......... *H04W 76/023* (2013.01); *H04W 4/005* (2013.01); *H04W 12/02* (2013.01);
(Continued)

(58) Field of Classification Search
USPC .................. 455/7, 11.1, 41.1–41.3
See application file for complete search history.

(56) References Cited

U.S. PATENT DOCUMENTS

| | | | |
|---|---|---|---|
| 8,825,040 B2 * | 9/2014 | Hooli | H04W 72/02 455/11.1 |
| 2005/0097248 A1 | 5/2005 | Kelley | |

(Continued)

FOREIGN PATENT DOCUMENTS

| | | |
|---|---|---|
| JP | 2006-524973 | 11/2006 |
| JP | 2010-152917 | 7/2010 |
| WO | WO 2015/015340 A2 | 2/2005 |

*Primary Examiner* — Fayyaz Alam
(74) *Attorney, Agent, or Firm* — Staas & Halsey LLP

(57) ABSTRACT

A communication method executed by an information processing apparatus, the communication method including determining whether coupling of a second external device with a first external device is available based on attribute information on the first external device and attribute information on the second external device in a memory, each of the first external device and the second external device being coupled to the information processing apparatus through wireless communication respectively, cutting off coupling between the first external device and the information processing apparatus when it is determined that the coupling of the second external device with the first external device is available, and transmitting coupling information to the second external device, the coupling information being information for coupling with the first external device and being stored in the memory.

19 Claims, 36 Drawing Sheets (1)            (2)

(51) Int. Cl.
*H04W 4/00* (2009.01)
*H04W 12/02* (2009.01)
*H04W 12/06* (2009.01)
*H04W 88/04* (2009.01)
*H04W 84/18* (2009.01)

(52) U.S. Cl.
CPC ............ *H04W 12/06* (2013.01); *H04W 84/18* (2013.01); *H04W 88/04* (2013.01)

(56) References Cited

U.S. PATENT DOCUMENTS

| | | | | |
|---|---|---|---|---|
| 2011/0117907 | A1* | 5/2011 | Hooli | H04W 72/02 455/422.1 |
| 2011/0176476 | A1* | 7/2011 | Tsuruoka | H04B 7/155 370/315 |
| 2013/0128067 | A1* | 5/2013 | Boland | H04N 5/23203 348/211.2 |
| 2014/0185587 | A1* | 7/2014 | Jang | H04W 36/0005 370/331 |

* cited by examiner

FIG. 9

| MAC ADDRESS | TIME | ACCESS INFORMATION NECESSITY | ONE-TIME CODE |
|---|---|---|---|
| Aa:bb:cc:dd:ee:ff | 12:32:30 | TRUE | 8762 |

FIG. 10

| DRIVER NAME | SSID | PASSWORD | MAC ADDRESS | CONNECTION METHOD | COMMON KEY |
|---|---|---|---|---|---|
| ... | ... | ... | ... | ... | ... |
| ⋮ | ⋮ | ⋮ | ⋮ | ⋮ | ⋮ |

| CONNECTION METHOD | SSID | ONE-TIME CODE | MAC ADDRESS |
|---|---|---|---|
| WiFi | N/A | N/A | 11:22:33:44:555:66 |
| WiFi-direct | Yxyax | N/A | 66:55:44:33:22:11 |
| BLE | 345xa | 8761 | Aa:bb:cc:dd:ee:ff |

FIG. 15

| TERMINAL ID | GADGET A | GADGET B | ... | GADGET Z |
|---|---|---|---|---|
| 356Hgiert | ○ (ONLY app1) | ○ | ... | × |
| ... | ... | ... | ... | ... |
| ⋮ | ⋮ | ⋮ | ⋮ | ⋮ |

FIG. 16

| DRIVER NAME | SSID | PASSWORD | MAC ADDRESS | CONNECTION METHOD |
|---|---|---|---|---|
| DRIVER A | abcdefg | Qwertyu | 12:23:34:45:67:89 | WPA |
| DRIVER B | gfedcba | poiuyt | 98:76:54:34:23:12 | WAP |
| DRIVER C | ... | ... | ... | Bluetooth (REGISTERED TRADEMARK) |

FIG. 17

| TERMINAL ID | AUTHENTICATION SCHEME | AUTHENTICATION INFORMATION |
|---|---|---|
| 356Hgiert | PUBLIC KEY-BASED SCHEME (RSA SCHEME) | PUBLIC KEY OF RSA |
| ⋮ | ⋮ | ⋮ |

FIG. 18

| DRIVER NAME | SSID | PASSWORD | MAC ADDRESS | CONNECTION METHOD | PORT NUMBER | ACCOMMODATION ALLOWABLE NUMBER |
|---|---|---|---|---|---|---|
| ... | ... | ... | ... | ... | ... | ... |
| ... | ... | ... | ... | ... | ... | ... |
| ... | ... | ... | ... | ... | ... | ... |

FIG. 20

| DRIVER NAME | CONNECTION METHOD | ACCESS INFORMATION | PROGRAM PART | USAGE PROTOCOL | ENVIRONMENT INFORMATION |
|---|---|---|---|---|---|
| LensCam | Wifi-Direct | SSID : yyax8<br>PASSWORD : 123456<br>MAC ADDRESS : aa:bb:cc:dd:ee:ff<br>ADDRESS DETERMINATION METHOD : SSDP PROTOCOL | Web Component FORMAT,<br>binary:[<polymer-element><br>..OMITTED..<br></polymer-element>] | HTTP | OS : android<br>PROGRAM : binary1{a.apk}<br>OS : docker<br>PROGRAM : binary1{vm1.img} |
| Sensor1 | BLE | MAC ADDRESS : 11:22:33:44:55:66<br>ADDRESS DETERMINATION METHOD : MACAddr | Web Component FORMAT,<br>binary:[<polymer-element><br>..OMITTED..<br></polymer-element>] | HTTP | OS : android<br>PROGRAM : binary1{b.apk}<br>binary2{c.apk}<br>OS : docker<br>PROGRAM : binary1{vm2.img} |
| SDcard | Wifi-AP | SSID : abcdef<br>PASSWORD : yuiop<br>MAC ADDRESS : 22:33:44:55:66:77<br>ADDRESS DETERMINATION METHOD : xxx.xxx.xxx.1 | Web Component FORMAT,<br>binary:[<polymer-element><br>..OMITTED..<br></polymer-element>] | HTTP | OS : android<br>PROGRAM : N/A<br>OS : docker<br>PROGRAM : binary1{vm3.img} |
| Extend Device | Wifi-Direct | SSID : yyax8<br>PASSWORD : 123456<br>MAC ADDRESS : aa:bb:cc:dd:ee:ff<br>ADDRESS DETERMINATION METHOD : SSDP PROTOCOL,<br>MACAddr | Web Component FORMAT,<br>binary:[<polymer-element><br>..OMITTED..<br></polymer-element>] | HTTP | OS : android<br>PROGRAM : binary1{d.apk}<br>OS : docker<br>PROGRAM : binary1{vm4.img} |

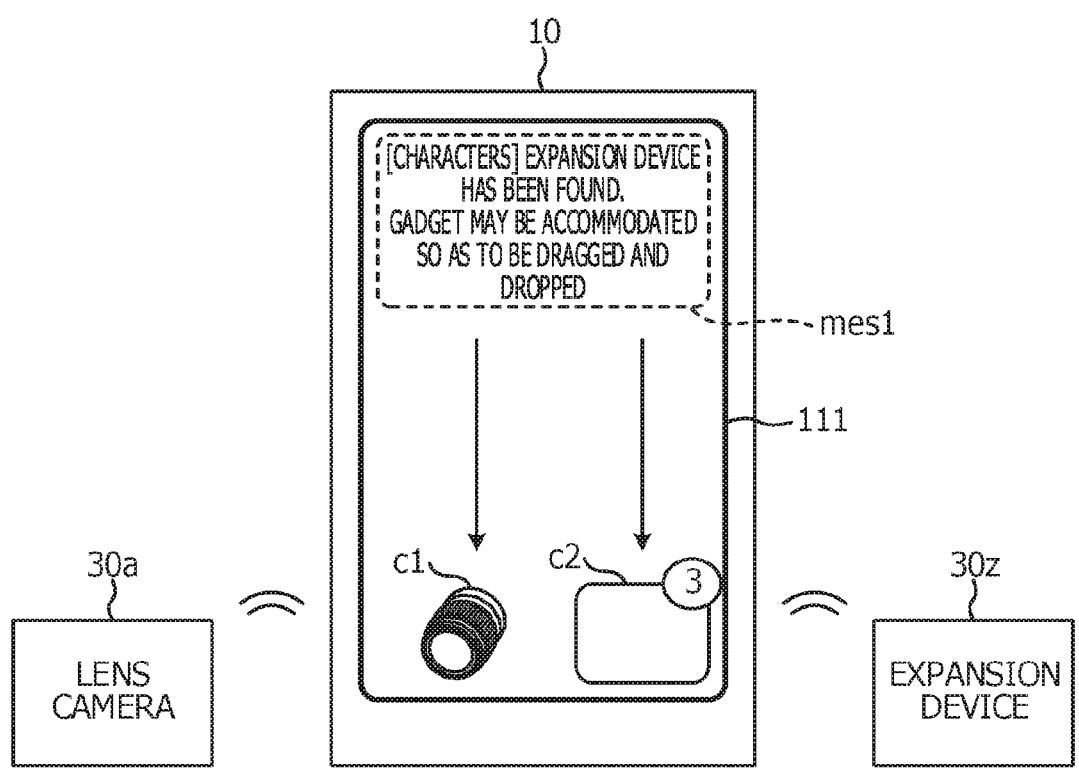

FIG. 23

```
<polymer-element name="lens-gadget" attributes="ip port">     ~511
  <template>
    <div id="gadget" class="gadget" name= style="display: block;">
    <div class="tooltip">
      <span>Camera</span>
      <span> <img id="lens-gadget" src=" lens.jpg " /></span>
      <span class=tooltipBody>
          <button on-click=takePhoto></button>
      </span>
    </div>
  </template>
  <script>
    Polymer('lens-gadget', {
      INITIALIZATION FUNCTION:,{}
       ........
       TakePhoto: function(){    ~512
         var httpObj = new XMLHttpRequest();
         var url = "http://"+ this.ip +":"+ this.port  + "/",   ~513
         httpObj.open( "POST", url);
         var send = JSON.stringify ({"method": "actTakePicture","params": [],"id": 1,"version": "1.0"});   ~514
         httpObj.send(send);
       },
       StartRecording: function(){  ~515
         :
       }
    });
  </script>
</polymer-element>
```
(510)

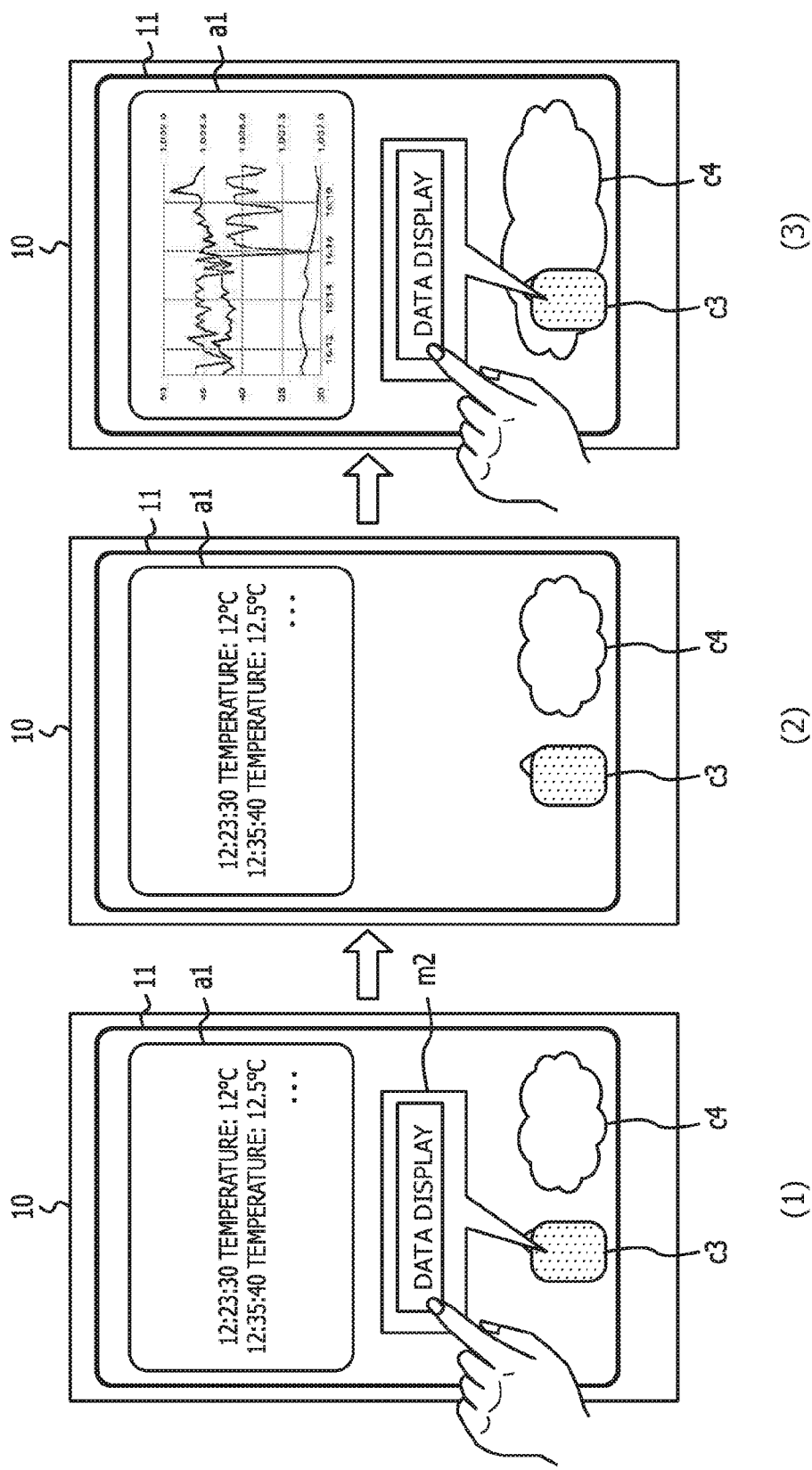

COMMUNICATION METHOD, INFORMATION PROCESSING APPARATUS, AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2015-065088, filed on Mar. 26, 2015, the entire contents of which are incorporated herein by reference.

FIELD

The embodiments discussed herein are related to a communication method, an information processing device, and a non-transitory computer-readable recording medium storing a communication control program.

BACKGROUND

The number of types of devices allowed to cooperate with a smart terminal such as a smartphone (hereinafter simply referred to as "gadgets") has been increasing. As an example of the gadget allowed to cooperate with the smart terminal, there is peripheral device allowed to expand a camera function, a storage function, a display function, or the like, of the smart terminal. When a number of gadgets cooperate with the smart terminal, a user may receive more sophisticated services.

However, the resources included in the smartphone, which is used for cooperation with the gadgets, (for example, radio band, the number of connectors, and the like) are limited. Thus, when the number of gadgets that are the cooperation targets are increased, it is desirable that a connection configuration between the smartphone and the gadgets is changed so that the cooperation between the smartphone and some or all of the gadgets is performed through a gadget that functions as an access point.

FIG. 1 is a diagram illustrating a change in a connection configuration between a smart terminal and gadgets. In (1), a smart terminal is coupled to each of gadgets d1 and d2 directly. In (2), an example of a connection configuration when a gadget d3 is further coupled to the smart terminal is illustrated. In this case, for example, it is assumed that the gadget d3 is not allowed to be coupled to the smart terminal directly due to lack of the bandwidth of the smart terminal. Therefore, a gadget d4 allowed to function as an access point is coupled to the smart terminal, and the gadgets d2 and d3 are coupled to the smart terminal through the gadget d4.

Japanese National Publication of International Patent Application No. 2006-524973 and Japanese Laid-open Patent Publication No. 2010-152917 are related arts.

SUMMARY

According to an aspect of the invention, a communication method executed by an information processing apparatus, the communication method including determining whether coupling of a second external device with a first external device is available based on attribute information on the first external device and attribute information on the second external device in a memory, each of the first external device and the second external device being coupled to the information processing apparatus through wireless communication respectively, cutting off coupling between the first external device and the information processing apparatus when it is determined that the coupling of the second external device with the first external device is available, and transmitting coupling information to the second external device, the coupling information being information for coupling with the first external device and being stored in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating a configuration example of registration completion notification;

FIG. 10 is a diagram illustrating a configuration example of a registration information storage unit;

FIG. 14 is a diagram illustrating an example of a detection list;

FIG. 15 is a diagram illustrating a configuration example of an allow list storage unit;

FIG. 16 is a diagram illustrating a configuration example of a gadget list storage unit;

FIG. 17 is a diagram illustrating a configuration example of a terminal information storage unit;

FIG. 18 is a diagram illustrating a configuration example of a detected gadget list;

FIG. 20 is a diagram illustrating a configuration example of a driver;

FIG. 22 is a diagram illustrating a second display example of an icon corresponding to a driver;

FIG. 23 is a diagram illustrating an example of the definition content of a driver;

FIG. 36 is a diagram illustrating a cooperation example with cloud service that provides a BaaS function.

DESCRIPTION OF EMBODIMENTS

Figure 1:
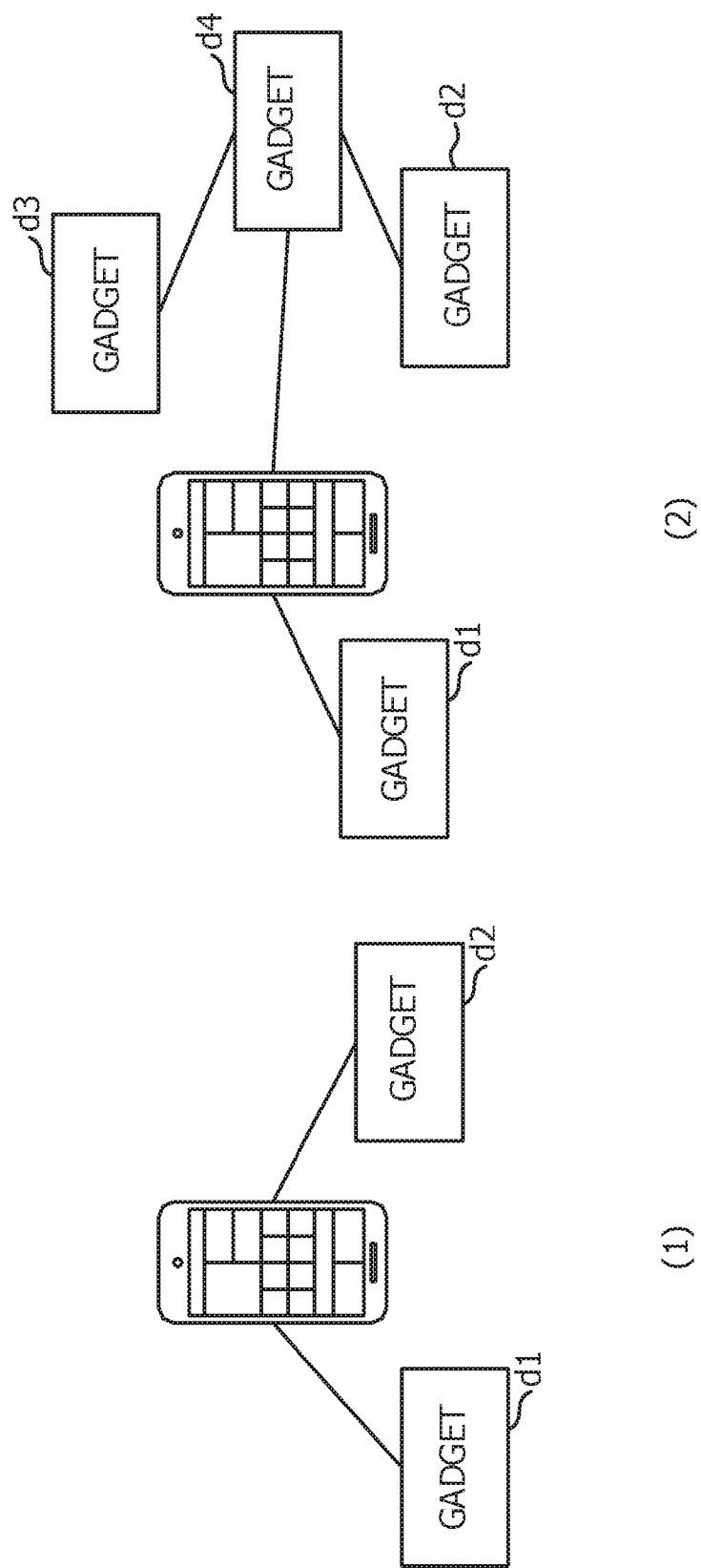
FIG. 1 is a diagram illustrating a change in a connection configuration between a smart terminal and gadgets.

In the related art, it is desirable that the user changes the setting for each of the related gadgets manually in order to change the state from the state of (1) to the state of (2) in FIG. 1. For example, it is desirable that setting in which each of the gadgets d2 and d3 is coupled to the smart terminal through the gadget d4 is performed on the corresponding gadget. In FIG. 1, for convenience, a relatively-simple network configuration is illustrated, but when the number of gadgets coupled to the smart terminal is increased, it is expected that such work becomes further complicated.

According to an aspect of the present disclosure, one of the purposes is to reduce an operation load to change a connection configuration between an information processing device and devices.

Figure 2:
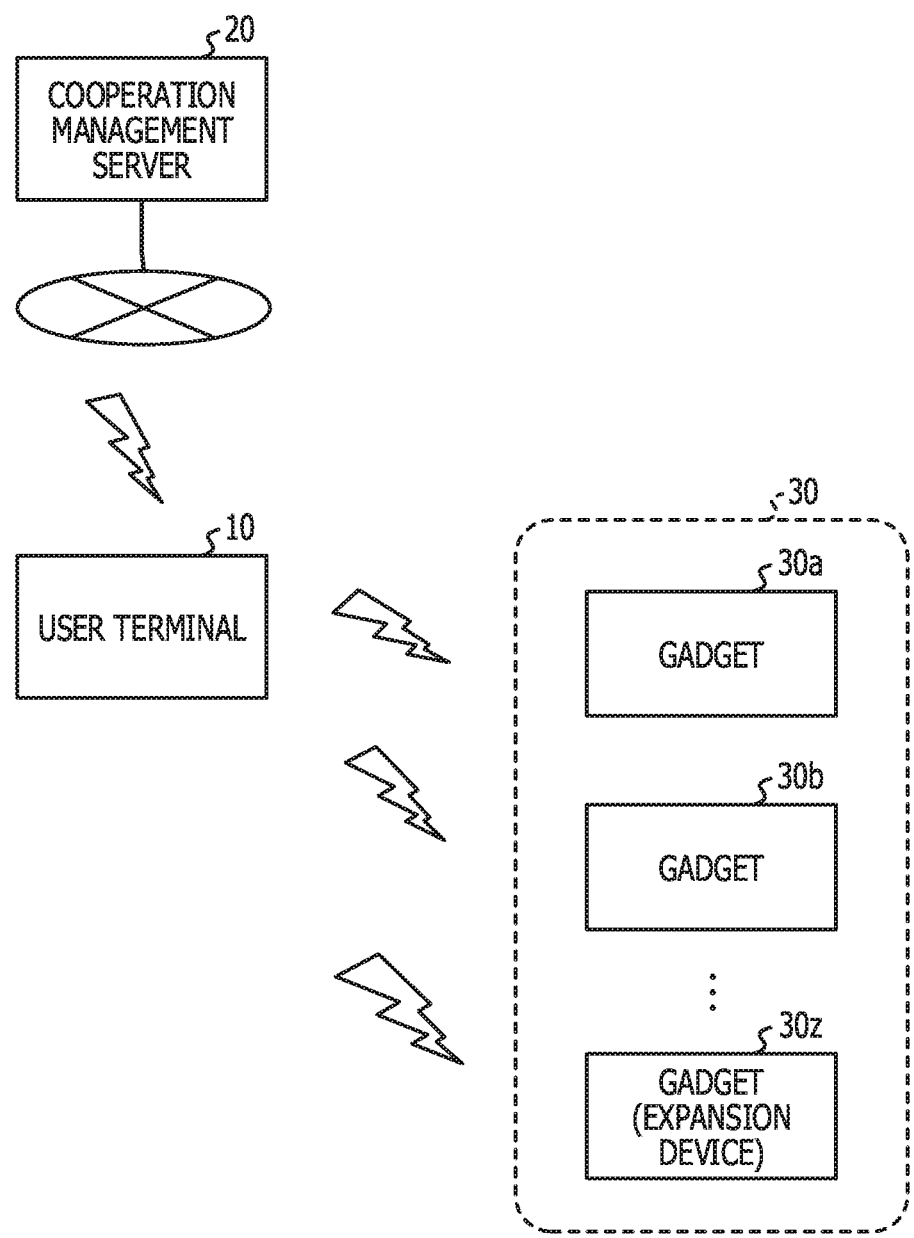
FIG. 2 is a diagram illustrating a system configuration example in an embodiment.

Embodiments are described below with reference to drawings. FIG. 2 is a diagram illustrating a system configuration example in an embodiment. In FIG. 2, one or more user terminals 10 may communicate with a cooperation management server 20 through wireless communication such as a wireless Local Area Network (LAN). In addition, each of the user terminals 10 may communicate with one or more gadgets 30 such as gadgets 30a and 30b through wireless communication such as a wireless LAN or Bluetooth (registered trademark). For convenience of explanation, it is assumed that the system configuration illustrated in FIG. 2 is built within a certain company (hereinafter referred to as "company A").

The user terminal 10 is a terminal operated by the user directly. As an example of the user terminal 10, there is a smart terminal such as a smartphone or a tablet terminal. However, a further type of an information processing device such as a Personal Computer (PC), by which wireless communication is available, may be used as the user terminal 10. In the embodiment, the user terminal 10 executes processing of cooperating with the gadget 30 through the wireless communication. The user of the user terminal 10 is, for example, an employee at the company A.

The gadget 30 is an example of external device that cooperates with the user terminal 10. For example, peripheral device that allows a camera function, a storage function, a display function, or the like, of the user terminal 10 to be expanded may be used as the gadget 30. Alternatively, a household electrical appliance such as an air conditioner may be used as the gadget 30.

In the embodiment, it is assumed that some of the gadgets 30 are gadgets each having an ability to accommodate a further gadget 30 (hereinafter referred to as "expansion device"). The ability to accommodate the further gadget 30 is, for example, an ability to relay communication between the user terminal 10 and the further gadget 30. For example, a gadget to function as an access point of wireless communication is the expansion device. As a specific example of the expansion device, there are a Wireless Fidelity (WiFi) (registered trademark) router, a charging stand of the user terminal 10, and the like. In addition, a smartphone, a tablet terminal, and the like may be used as expansion devices. In FIG. 2, an example is illustrated in which a gadget 30z is the expansion device. Hereinafter, the gadget 30z is referred to as an expansion device 30z. However, when the gadget is simply referred to as the gadget 30, the gadget 30 includes the expansion device 30z as well.

The cooperation management server 20 is a computer that manages information desired when each of the user terminals 10 is coupled to the gadget 30, information indicating the gadget 30 allowed to perform cooperation with (access to) a Web application installed in each of the user terminals 10 (hereinafter referred to as "Web application"), and the like. That is, in the embodiment, a system administrator of the company A determines a Web application allowed to cooperate with each of the gadgets 30, from among Web applications installed in each of the user terminals 10.

The Web application is an application using HyperText Markup Language (HTML), Cascading Style Sheets (CSS), JavaScript (registered trademark), and the like as configuration elements. In the embodiment, the Web application is a Web application of a Packaged Web apps format.

Figure 3:
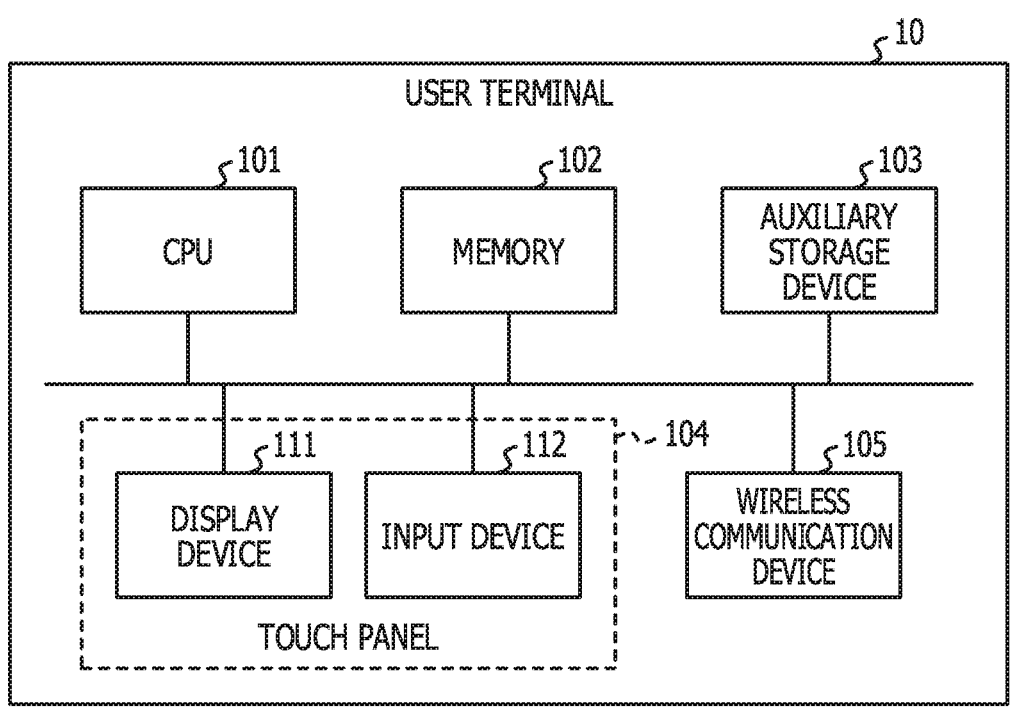
FIG. 3 is a hardware configuration example of a user terminal according to the embodiment.

FIG. 3 is a hardware configuration example of the user terminal according to the embodiment. In FIG. 3, the user terminal 10 includes a CPU 101, a memory 102, an auxiliary storage device 103, a touch panel 104, and a wireless communication device 105.

The auxiliary storage device 103 stores a program installed in the user terminal 10, and the like. When start of the program is instructed, the memory 102 reads the program from the auxiliary storage device 103 and stores the program. The CPU 101 achieves a function related to the user terminal 10 in accordance with the program stored in the memory 102.

The touch panel 104 is an electronic component including both an input function and a display function, and performs display of information, acceptance of an input from the user, and the like. The touch panel 104 includes a display device 111 and an input device 112.

The display device 111 is a crystal liquid display or the like, and plays a display role of the touch panel 104. The input device 112 is an electronic component including a sensor that detects contact of a contact object with the display device 111. As a detection scheme of contact of the contact object, a known scheme such as an electrostatic scheme, a resistance film scheme, or an optical scheme may be employed. The contact object is an object that comes into contact with the contact surface of the touch panel 104. As an example of such an object, there is a finger of the user, a dedicated or general pen, or the like.

The wireless communication device 105 is an electronic component used to perform wireless communication.

Figure 4:
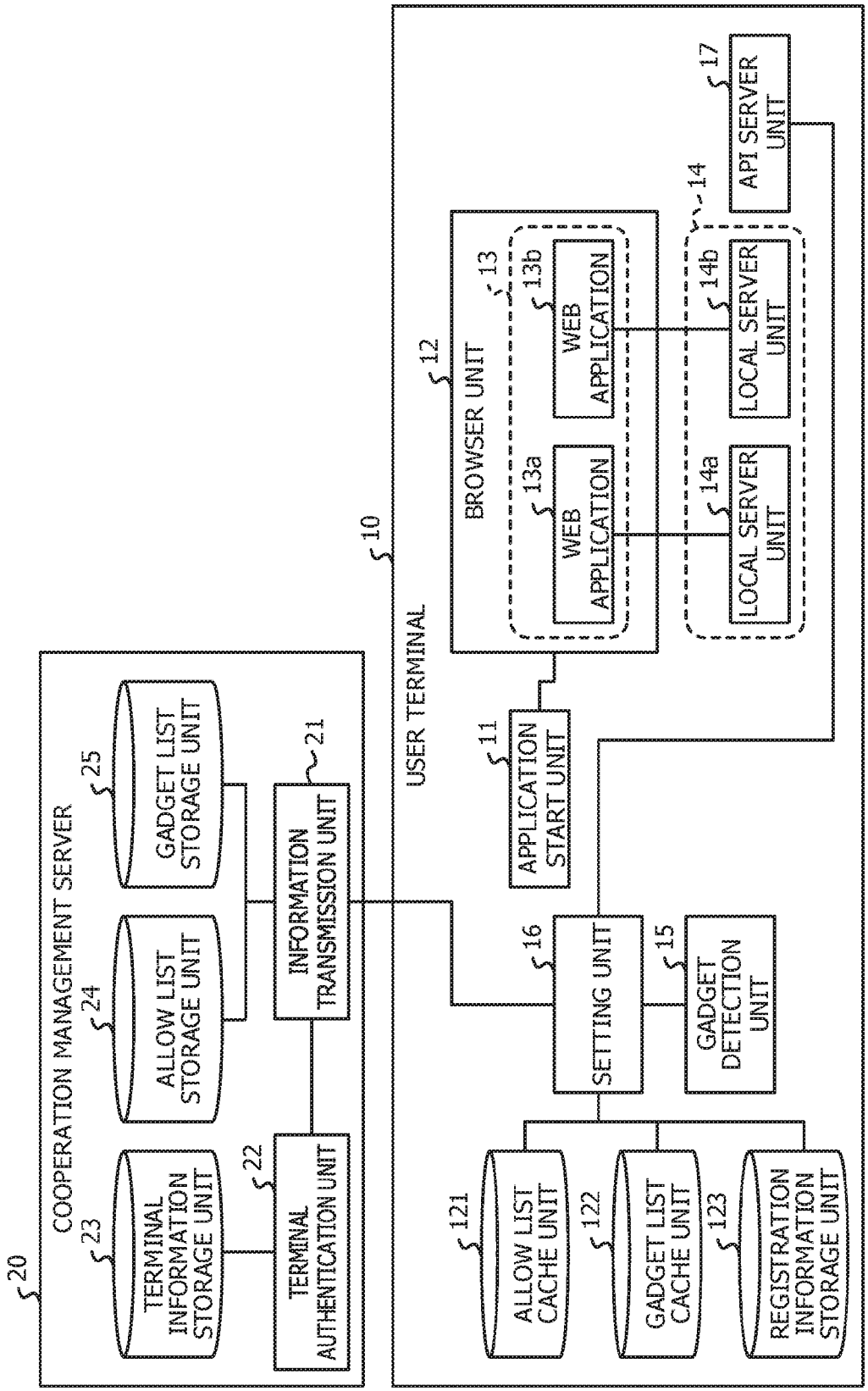
FIG. 4 is a diagram illustrating function configuration examples of a cooperation management server and the user terminal according to the embodiment.

FIG. 4 is a diagram illustrating function configuration examples of the cooperation management server and the user terminal according to the embodiment. In FIG. 4, the cooperation management server 20 includes an information transmission unit 21 and a terminal authentication unit 22. Each of the units is achieved by processing of causing the CPU of the cooperation management server 20 to execute the program installed in the cooperation management server 20. The cooperation management server 20 further uses a terminal information storage unit 23, an allow list storage unit 24, a gadget list storage unit 25, and the like. Each of the storage units is achieved by using the auxiliary storage device of the cooperation management server 20, a storage device allowed to be coupled to the cooperation management server 20 through a network, or the like.

The information transmission unit 21 sends back information stored in the allow list storage unit 24 (hereinafter referred to as "allow list) and information stored in the gadget list storage unit 25 (hereinafter referred to as "gadget list information"), in response to a request from the user terminal 10. The allow list is information indicating a Web application 13 allowed to cooperate with each of the gadgets 30 (Web application 13 allowed to access the each of the gadgets 30), from among the Web applications 13 installed in the user terminal 10. The gadget list information is a list of gadget information for each of the gadgets 30. The gadget information is attribute information of the gadget 30. The gadget information includes information desired for connection of the user terminal 10 with the gadget 30. For example, a Service Set Identifier (SSID), a password, and the like are included in the gadget information.

The terminal authentication unit 22 performs authentication on the user terminal 10 that requests the allow list and the gadget list information. The authentication is performed with reference to the terminal information storage unit 23.

The user terminal 10 includes an application start unit 11, a browser unit 12, one or more Web applications 13 such as Web applications 13a and 13b, local server units 14 for the respective Web applications 13a and 13b such as local server units 14a and 14b, a gadget detection unit 15, a setting unit 16, and an API server unit 17. Each of the units is achieved by processing of causing the CPU 101 to execute one or more programs installed in the user terminal 10. The user terminal 10 further includes storage units such as an allow list cache unit 121, a gadget list cache unit 122, and a registration information storage unit 123. Each of the storage units is achieved by using the auxiliary storage device 103, the memory 102, or the like.

The application start unit 11 executes start processing of the Web application 13 that has been selected as a start target, from among the Web applications 13 installed in the user terminal 10. The application start unit 11 assigns a combination of an IP address and a port number (that is, a Uniform Resource Locator (URL)), to content data of the Web application 13 that is the start target, in the course of the start processing of the Web application 13. The content data of the Web application 13 is an aggregate of a HTML file, a CSS file, a JavaScript file, and the like, and stored in the auxiliary storage device 103. The application start unit 11 further generates a thread of the local server unit 14 corresponding to the Web application 13 that is the start target, in the start processing.

The browser unit 12 functions as a Web browser. The browser unit 12 is also an execution environment of the Web application 13. That is, the browser unit 12 analyzes the content of the content data of the Web application 13, and performs display of an image based on the content data, execution of processing based on the content data, and the like. The browser unit 12 may limit access to externals by each of the Web applications 13, based on Content Security Policy (CSP). That is, an access destination to externals by each of the Web applications 13 may be basically limited to an IP address included in a white list for each of the Web applications 13.

The local server unit 14 functions as a Web server in the user terminal 10. That is, the local server unit 14 generates (opens) a socket communication port (hereinafter referred to as "server port"), and waits for a Hyper Text Transfer Protocol (HTTP) request to the server port. When the local server unit 14 receives an obtaining request of the content data of the Web application 13 (HTTP request) from the browser unit 12 through the server port, the local server unit 14 sends back a response including the content data (HTTP response) to the browser unit 12. The IP address of a server port of a certain local server unit 14 is the same as the IP address that has been assigned to the content data of the Web application 13 corresponding to the local server unit 14. Thus, in the obtaining request of the content data, the IP address that has been assigned to the content data is specified. As a result, the browser unit 12 recognizes that the download source of the content data is the Web application 13 that belongs to a domain of the IP address. In the embodiment, the IP addresses of server ports of the respective local server units 14 are the same.

The API server unit 17 is coupled to the gadget through wireless communication, and mediates or acts for access to the gadget 30 by each of the Web applications 13. For example, the API server unit 17 generates (opens) a socket communication port (hereinafter referred to as "API port") as an interface used to accept an access request to the gadget 30 from the Web application 13. The API port is generated for each of the gadgets 30. To the API port, the same IP address as the content data of the Web application 13 that has requested to open the API port may be assigned.

When the access destination of the Web application 13 is limited based on the CSP, the access destination of the Web application 13 is basically limited to the range of the white list corresponding to the Web application 13 (white list of the CSP) by the browser unit 12. However, even in the CSP, Same-Origin Policy is valid. That is, the browser unit 12 allows access by the Web application 13 regardless of the white list as long as the access destination corresponds to the range of the domain of the IP address of the origin of the Web application 13 (download source of the content data). Thus, when a certain Web application 13 tries to access an API port, the access is allowed by the browser unit 12 as long as the IP address of the API port is the same as the IP address of the content data of the Web application 13. This is why the access corresponds to access to the same domain as the origin of the Web application 13 when viewed from the browser unit 12.

When a certain API port is accessed by the Web application 13, the API server unit 17 accesses a gadget 30 corresponding to the API port. That is, a method constituting an API that has been published in the gadget 30 is called. As a result, the Web application 13 may access the gadget 30 in practice. From among methods constituting the API that has been published by the gadget 30, a method that is to be called by the API server unit 17 is specified by the Web application 13.

The gadget detection unit 15 detects the presence of the gadget 30 through the wireless communication. When a gadget 30 is detected by the gadget detection unit 15, the setting unit 16 downloads an allow list and gadget list information, from the cooperation management server 20. The pieces of downloaded information are respectively stored in the allow list cache unit 121 and the gadget list cache unit 122. The setting unit 16 further requests the API server unit 17 to generate an API port corresponding to the detected gadget 30. The registration information storage unit 123 stores attribute information related to the expansion device 30z.

Figure 5:
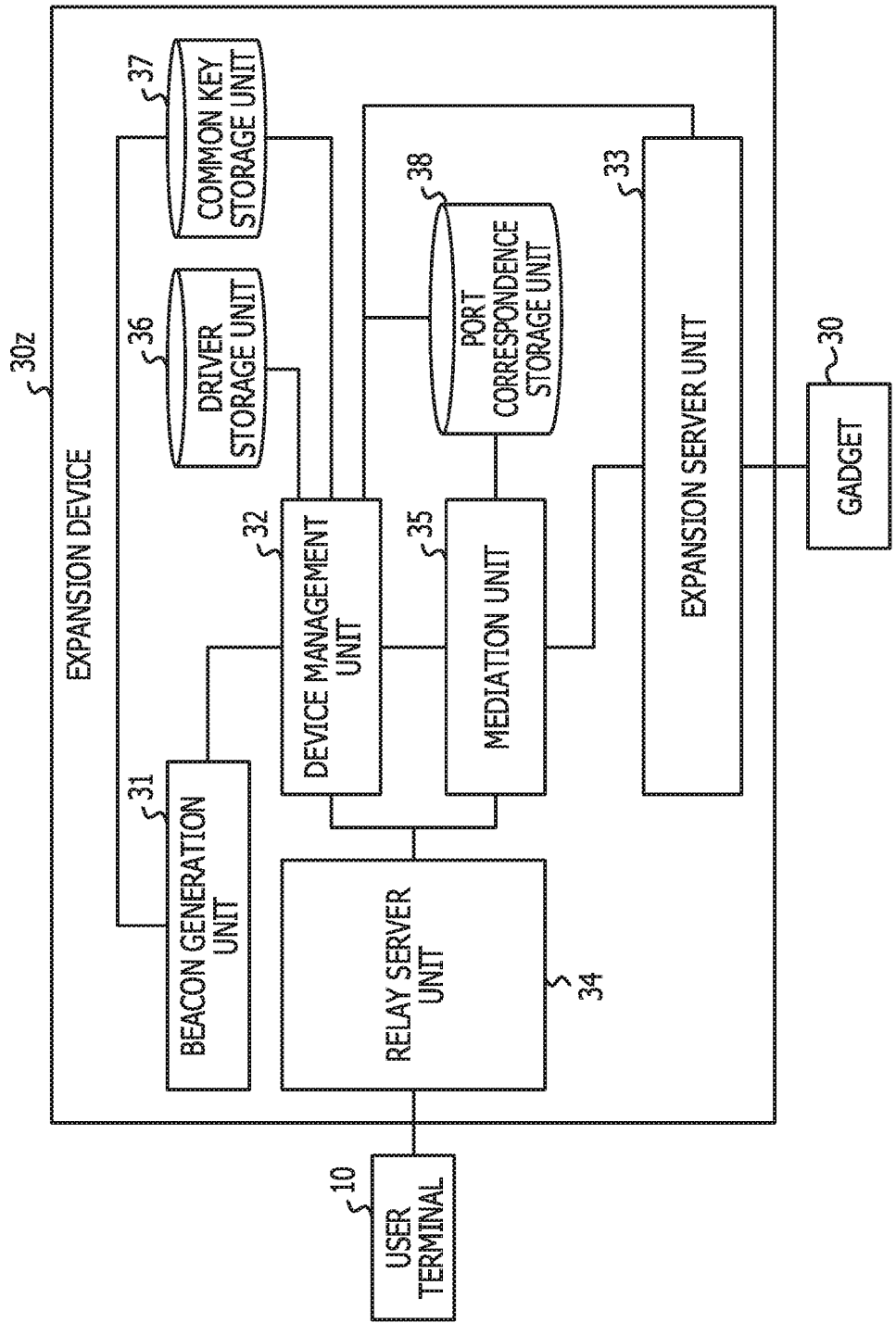
FIG. 5 is a function configuration example of an expansion device according to the embodiment.

FIG. 5 is a function configuration example of the expansion device according to the embodiment. In FIG. 5, the expansion device 30z includes a beacon generation unit 31, a device management unit 32, an expansion server unit 33, a relay server unit 34, and a mediation unit 35. Each of the units is achieved by processing of causing the CPU of the expansion device 30z to execute one or more programs installed in the expansion device 30z. The expansion device 30z further includes a driver storage unit 36, a common key storage unit 37, and a port correspondence storage unit 38. Each of the storage units may be achieved by using a memory, an auxiliary storage device, or the like, of the expansion device 30z.

The beacon generation unit 31 generates a beacon used to notify the user terminal 10 of the presence of the expansion device 30z, and performs transmission of the generated beacon. The device management unit 32 controls processing of accommodating the gadget 30 in the expansion device 30z. The expansion server unit 33 generates a socket communication port used to call the API of the gadget 30 that has been accommodated in the expansion device 30z (hereinafter referred to as "expansion port"). The expansion port plays a role similar to the API port in the user terminal 10, and is generated for each of the gadgets 30 that have been accommodated in the expansion device 30z.

The relay server unit 34 generates a socket communication port used to relay the communication between the user terminal 10 and the API port corresponding to the gadget 30 that has been accommodated in the expansion device 30z (hereinafter referred to as "relay port"). That is, the relay port is a port used to provide an interface corresponding to the expansion port, for the user terminal 10, and is generated for each of the gadgets 30. The mediation unit 35 manages a correspondence relationship between the expansion port and the relay port, and sends a message for the expansion port, to the relay port. The information indicating the correspondence relationship is stored in the port correspondence storage unit 38.

The driver storage unit 36 stores a driver of the expansion device 30z. The driver is described later. The common key storage unit 37 stores an encryption key (common key) shared with the user terminal 10.

A processing procedure executed by the user terminal 10 is described below. In the embodiment, the user terminal 10 has two states of "registration mode" and "operation mode". The registration mode is a mode in which processing used for preparation of cooperation with the expansion device 30z is executed. The operation mode is a mode in which cooperation with the gadget 30 is performed. Therefore, first, processing executed in the registration mode is described. In the embodiment, in order to avoid cooperation with an unauthenticated expansion device 30z, processing used to build a trust-based relationship between the user terminal 10 and the expansion device 30z is executed in the registration mode. The processing is referred to as "registration processing".

Figure 6:
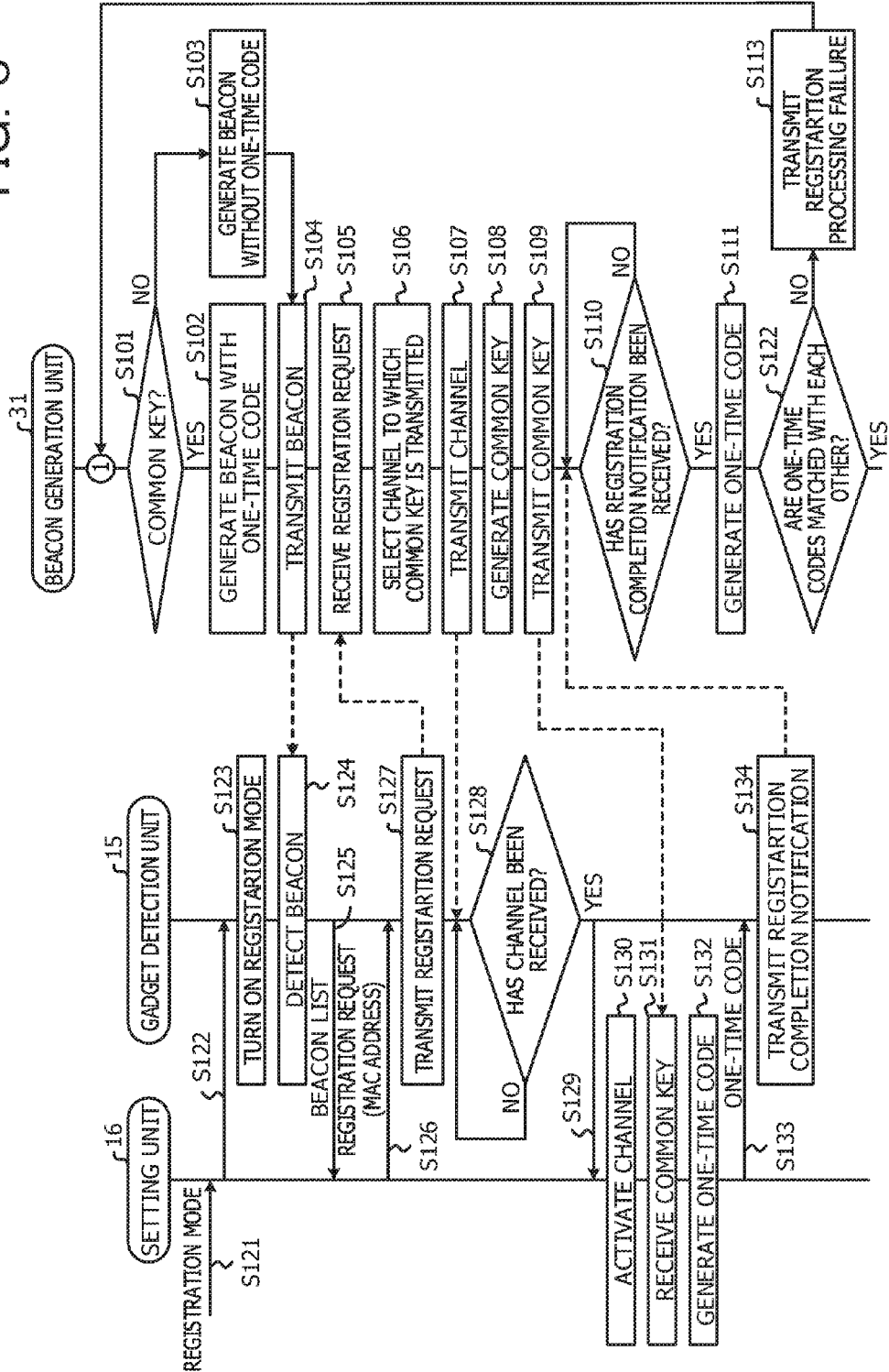
FIG. 6 is a diagram illustrating an example of a processing procedure of registration processing.
Figure 7:
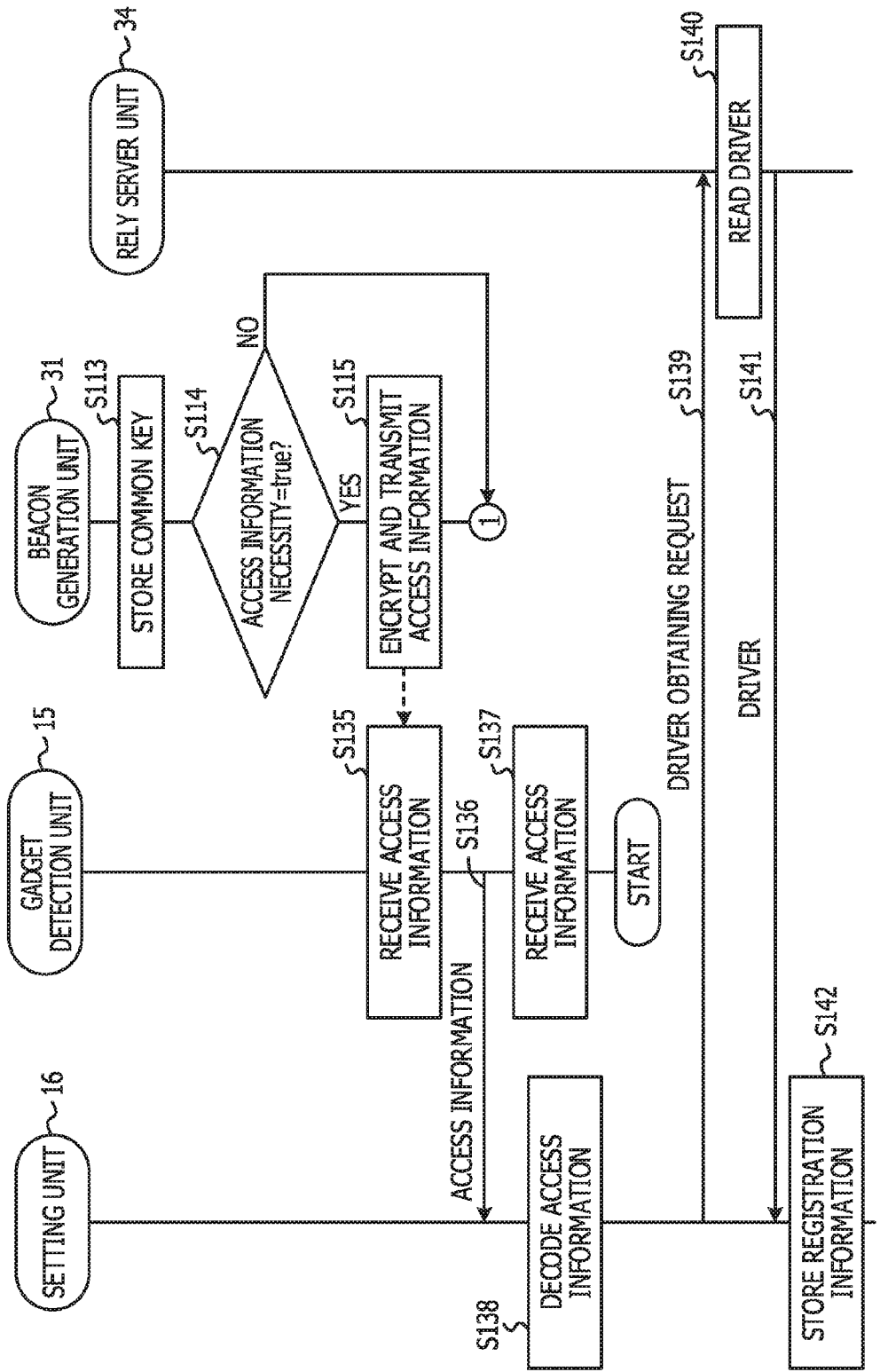
FIG. 7 is a diagram illustrating the example of the processing procedure of the registration processing.

FIGS. 6 and 7 are diagrams illustrating an example of a processing procedure of registration processing. The beacon generation unit 31 of the expansion device 30z generates data that is to be transmitted using a beacon (hereinafter, referred to as "beacon data") periodically (S101 to S103), and transmits (broadcasts) the generated beacon data by the beacon (S104). More specifically, when one or more common keys are stored in the common key storage unit 37 (Yes in S101), the beacon generation unit 31 generates a beacon that includes a one-time code generated based on the common key (S102). In addition, when a common key is not stored in the common key storage unit 37 (No in S101), the beacon generation unit 31 generates a beacon that does not include a one-time code (S103) because a one-time code is not generated. The one-time code is a password that is valid merely for a certain time period.

Figure 8:
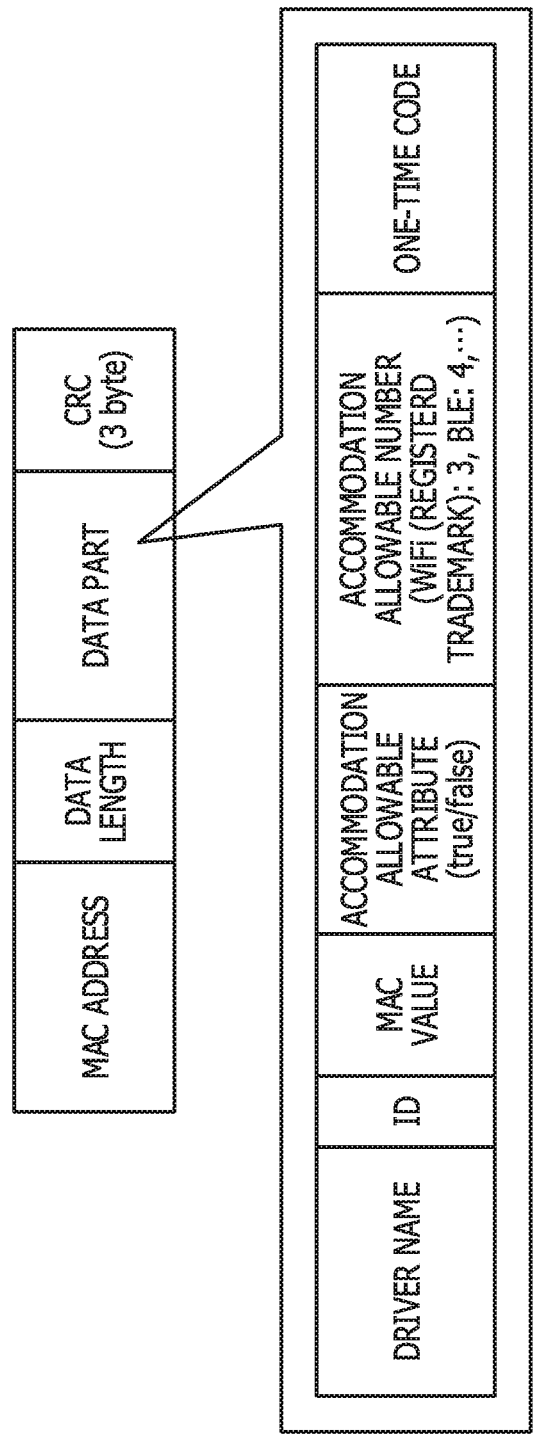
FIG. 8 is a configuration example of beacon data.

FIG. 8 is a configuration example of beacon data. In FIG. 8, the beacon data includes a MAC address, a data length, a data part, and a Cyclic Redundancy Check (CRC). The MAC address is a destination MAC address of the beacon. The data length is a data size in the data part. The data part is a body part of the beacon data, and includes, for example, a driver name, an ID, a MAC value, an accommodation allowable attribute, an accommodation allowable number, and a one-time code.

The driver name is an identification name of an expansion device 30z that is a transmission source of the beacon, and is also an identification name of a driver for the expansion device 30z. The driver is data including information desired for connection with the expansion device 30z. The ID is information used to identify the expansion device 30z in the wireless communication. For example, a Service Set Identifier (SSID) may be used as the ID. The MAC value is a MAC address of the expansion device 30z. The accommodation allowable attribute is information indicating whether a further gadget 30 is allowed to be accommodated, and has a value of "true" or "false". Here, "true" indicates that the further gadget 30 is allowed to be accommodated. In addition, "false" indicates that the further gadget is not allowed to be accommodated. In the case of the expansion device 30z, the value of the accommodation allowable attribute corresponds to "true". The accommodation allowable number is the number of remaining gadgets 30 that are allowed to be accommodated at the present time, and the value of the accommodation allowable number is valid when the value of the accommodation allowable attribute corresponds to "true". The accommodation allowable number includes, for example, a value for each connection method. The connection method is, for example, the type of wireless communication such as WiFi, Bluetooth, and Bluetooth Low Energy (BLE). The one-time code is the above-described one-time code. That is, when a common key is already stored in the common key storage unit 37, a one-time code is generated, and included in the beacon data. The structure of the beacon data is different, for example, depending on a connection method of the expansion device 30z that is the transmission source of the beacon. In addition, the common key is generated for each of the user terminals 10 for which the registration processing has been executed (registered user terminal 10). Thus, when the common key is not stored in the common key storage unit 37, it is indicated that there is no user terminal 10 for which the registration processing to the expansion devices 30z has been executed. When a plurality of common keys are stored in the common key storage unit 37 (when the registration processing to a plurality of user terminal 10 has been already executed), beacons including one-time codes generated by the respective common keys may be transmitted in order (or alternately) at certain intervals.

In addition, when the user of the user terminal 10 performs input of a transition instruction to the registration mode for the user terminal 10 through a certain operation, the setting unit 16 of the user terminal 10 instructs the gadget detection unit 15 to transition to the registration mode (S122). The gadget detection unit 15 turns ON the registration mode, in response to the request (S123). When the gadget detection unit 15 detects a beacon in the state in which the registration mode is turned ON (S124), the gadget detection unit 15 notifies the setting unit 16 of a beacon data list of the detected beacons (hereinafter referred to as "beacon list") (S125). There may be two or more expansion devices each of which emits a beacon, so that the beacon data list for all of the detected beacons is notified to the setting unit 16, as the detection list.

For example, the setting unit 16 displays the beacon list, and accepts selection of an expansion device that is a registration target, from the user. It is troublesome that all of the pieces of beacon data are displayed on the beacon list, so that the driver names of the pieces of beacon data may be displayed. When an opportunity of selection is provided for the user, an expansion device that is a cooperation target may be limited to an expansion device that has been allowed by the user. When an expansion device is selected from the beacon list by the user, the setting unit 16 specifies a MAC address of the selected expansion device, and requests the gadget detection unit 15 to perform registration of the expansion device (S126). Here, it is assumed that the expansion device 30z has been selected.

The gadget detection unit 15 transmits a beacon indicating the registration request, to the MAC address (S127). In the registration request, list information of a channel (medium) used to receive a common key that is to be generated by the beacon generation unit 31 (hereinafter referred to as "channel list") is included. As an example of such a channel, there is a camera, Near Field Communication (NFC), ultrasonic waves, or the like. Reception of the common key through the camera is achieved by capturing an image indicating a common key (for example, a two-dimensional code), which is displayed in the expansion device 30z, using the camera of the user terminal 10.

When the beacon generation unit 31 of the expansion device 30z that is the destination of the registration request receives the registration request (S105), the beacon generation unit 31 selects a channel that corresponds to the expansion device 30z, from the channel list (S106). After that, the beacon generation unit 31 transmits information indicating the selected channel, to the user terminal 10, by a beacon (S107). When the gadget detection unit 15 of the user terminal 10 receives the information (Yes in S128), the gadget detection unit 15 requests the setting unit 16 to prepare for reception of a common key by the channel indicated by the information (S129). The setting unit 16 activates the channel and prepares for reception of the common key (S130).

In addition, after the beacon generation unit 31 of the expansion device 30z has transmits the information indicating the channel, the beacon generation unit 31 generates a new common key (S108). That is, when a beacon with a one-time code has been transmitted in Step S104, a common key that is different from the common key that has been used to generate the one-time code is newly generated. This is why a common key is generated for each of the user terminals 10.

After that, the beacon generation unit 31 transmits the newly-generated common key through the channel that has been selected in Step S106 (5109). For example, the common key is transmitted through NFC or ultrasonic waves. Alternatively, when the camera has been selected as the channel, an image indicating the common key is displayed. In addition, the common key may be transmitted by a further channel.

When the setting unit 16 of the user terminal 10 receives the common key (S131), the setting unit 16 generates a one-time code using the common key (S132). The generation method of a one-time code by the setting unit 16 is similar to the generation method of a one-time code by the expansion device 30z. After that, the setting unit 16 notifies the gadget detection unit 15 of the one-time code that has been generated in Step S132 (S133). The gadget detection unit 15 transmits registration completion notification including the one-time code, to the expansion device 30z, using a beacon (S134).

FIG. 9 is a diagram illustrating a configuration example of registration completion notification. As illustrated in FIG. 9, in the registration completion notification, a MAC address, a time, access information necessity, and a one-time code are included. The MAC address is a MAC address of the user terminal 10. The time is the current time. The access information necessity is information indicating necessity of access information of the expansion device 30z. Here, "true" indicates that access information is desired, and "false" indicates that access information is not desired. The access information is information desired to access the expansion device 30z through the wireless communication, and for example, in the case of WiFi, a SSID or a password corresponds to access information. The one-time code is the one-time code that has been generated in Step S132.

When the beacon generation unit 31 of the expansion device 30z receives the registration completion notification (Yes in S110), the beacon generation unit 31 generates a one-time code using the common key that has been generated in Step S108 (5111). After that, the beacon generation unit 31 determines whether the generated one-time code is matched with a one-time code included in the registration completion notification (S112). When the two one-time codes are not matched with each other (No in S112), the beacon generation unit 31 transmits information indicating a failure of the registration processing, to the user terminal 10, using a beacon (S113).

In addition, when the two one-time codes are matched with each other (Yes in S112), the beacon generation unit 31 stores the common key that has been generated in Step S108 in the common key storage unit 37 so as to associate the common key with the MAC address of the user terminal 10 (S113 in FIG. 7). After that, the beacon generation unit 31 determines whether the value of the access information necessity included in the registration completion notification corresponds to "true" (S114). When the value of the access information necessity corresponds to "true" (Yes in S114), the beacon generation unit 31 encrypts the access information of the expansion device 30z (for example, a connection method, a SSID, a password, and the like) using the common key, and transmits the encrypted access information to the user terminal 10 using a beacon (S115).

When the gadget detection unit 15 of the user terminal 10 receives the access information (S135), the gadget detection unit 15 notifies the setting unit 16 of the access information (S136). After that, the gadget detection unit 15 turns OFF the registration mode (S137).

In addition, the setting unit 16 decodes the notified access information, using the common key that has been received in Step S131 (S138). After that, the setting unit 16 establishes wireless communication with the expansion device 30z, based on the access information, and transmits an obtaining request of a driver to the expansion device 30z through the wireless communication (S139).

The relay server unit 34 of the expansion device 30z obtains a driver stored in the driver storage unit 36, in response to the obtaining request (S140), and sends the driver back to the setting unit 16 (S141). When the setting unit 16 receives the driver, the setting unit 16 stores the driver in the auxiliary storage device 103, and stores registration information related to the expansion device 30z, in the registration information storage unit 123 (S142).

FIG. 10 is a diagram illustrating a configuration example of the registration information storage unit. As illustrated in FIG. 10, the registration information storage unit 123 stores registration information, for each of the registered expansion devices 30z. In the registration information, a driver name, a SSID, a password, a MAC address, a connection method, and a common key are included.

The driver name is an identification name of the expansion device 30z, and is also an identification name of the driver of the expansion device 30z. The SSID is an SSID for the expansion device 30z. The password is a password for the expansion device 30z. The MAC address is a MAC address of the expansion device 30z. The connection method is a connection method with the expansion device 30z through wireless communication. The common key is a common key that has been received in Step S132.

The driver name and the MAC address may be obtained from the beacon (FIG. 9). The SSID, the password, and the coupling information may be obtained from the access information that has been received in Step S135. Here, the password is different from a one-time code.

Figure 11:
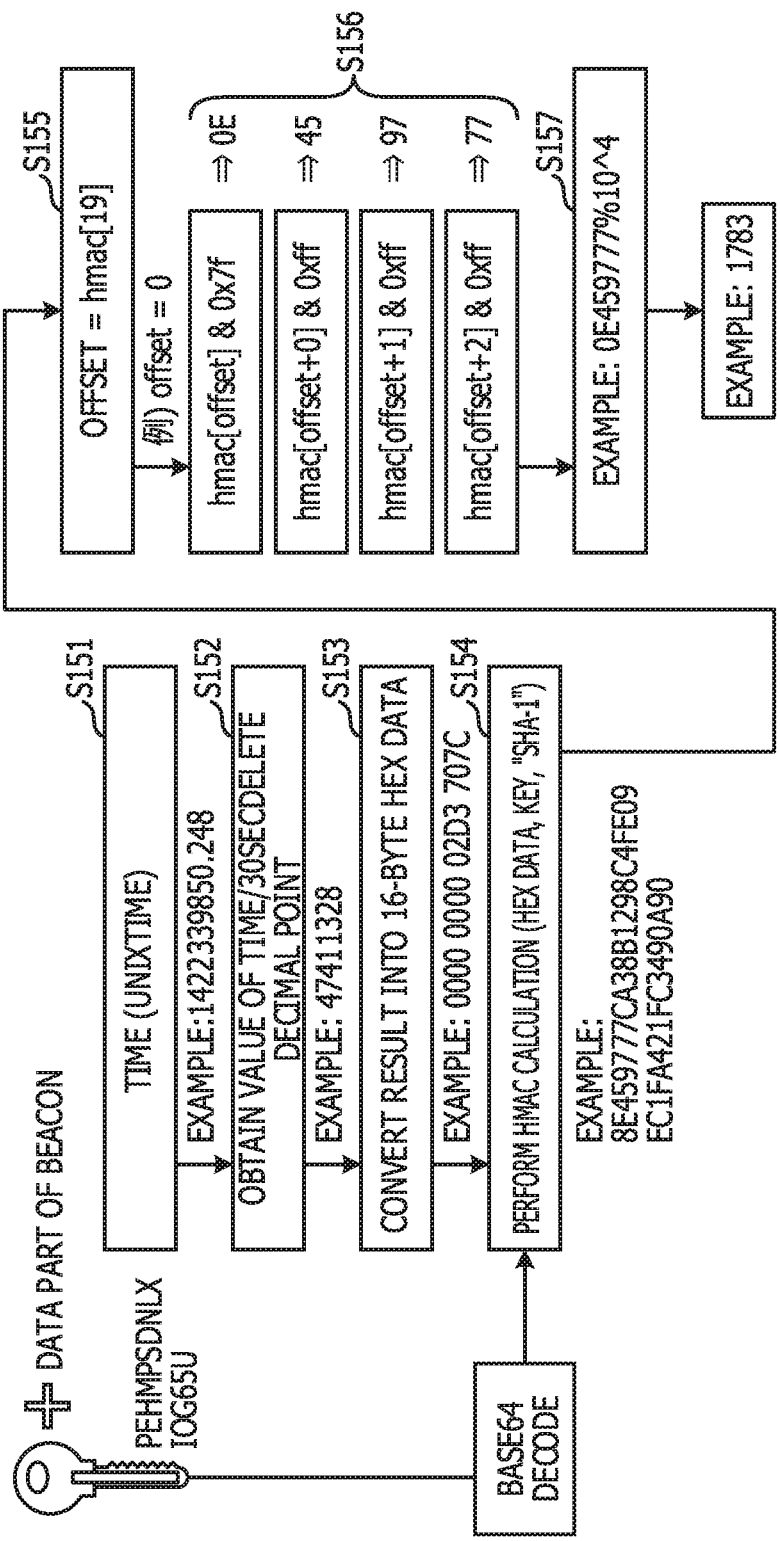
FIG. 11 is a diagram illustrating an example of a generation method of a one-time code.

An example of a generation method of a one-time code is described below. FIG. 11 is a diagram illustrating the example of the generation method of a one-time code. In FIG. 11, an example is illustrated in which a one-time code is calculated with reference to OAUTH Time-based One-Time Password (TOTP) and RFC 6238, but a one-time code may be generated by a further method.

First, the current time is obtained based on the time of UNIX (registered trademark) (S151). After that, the current time is divided by 30 seconds (S152). Here, the decimal point is deleted. As a result, even when a generation time of a one-time code is shifted by 30 seconds, an identical one-time code may be generated.

After that, the result that has been obtained by dividing the current time by 30 seconds is converted into 16-byte hexadecimal data (S153). After that, Hash-based Message Authentication Code (HMAC) calculation is performed based on the hexadecimal data and the result that has been obtained by decoding the common key and the data part of the beacon (FIG. 9) (except for the portion of the one-time code) using BASE64 (S154).

After that, the 19-th value of "hmac" that is a sequence in which the result of the HMAC calculation is stored is set as an offset value (offset) (S155). After that, the following calculation results are obtained (S156).

hmac[offset]&0x7f
hmac[offset+0]&0xff
hmac[offset+1]&0x7f
hmac[offset+2]&0x7f

The remainder obtained by dividing the value that has been obtained by combining the calculation results in order by the fourth power of 10 is set as a one-time code (S157).

Figure 12:
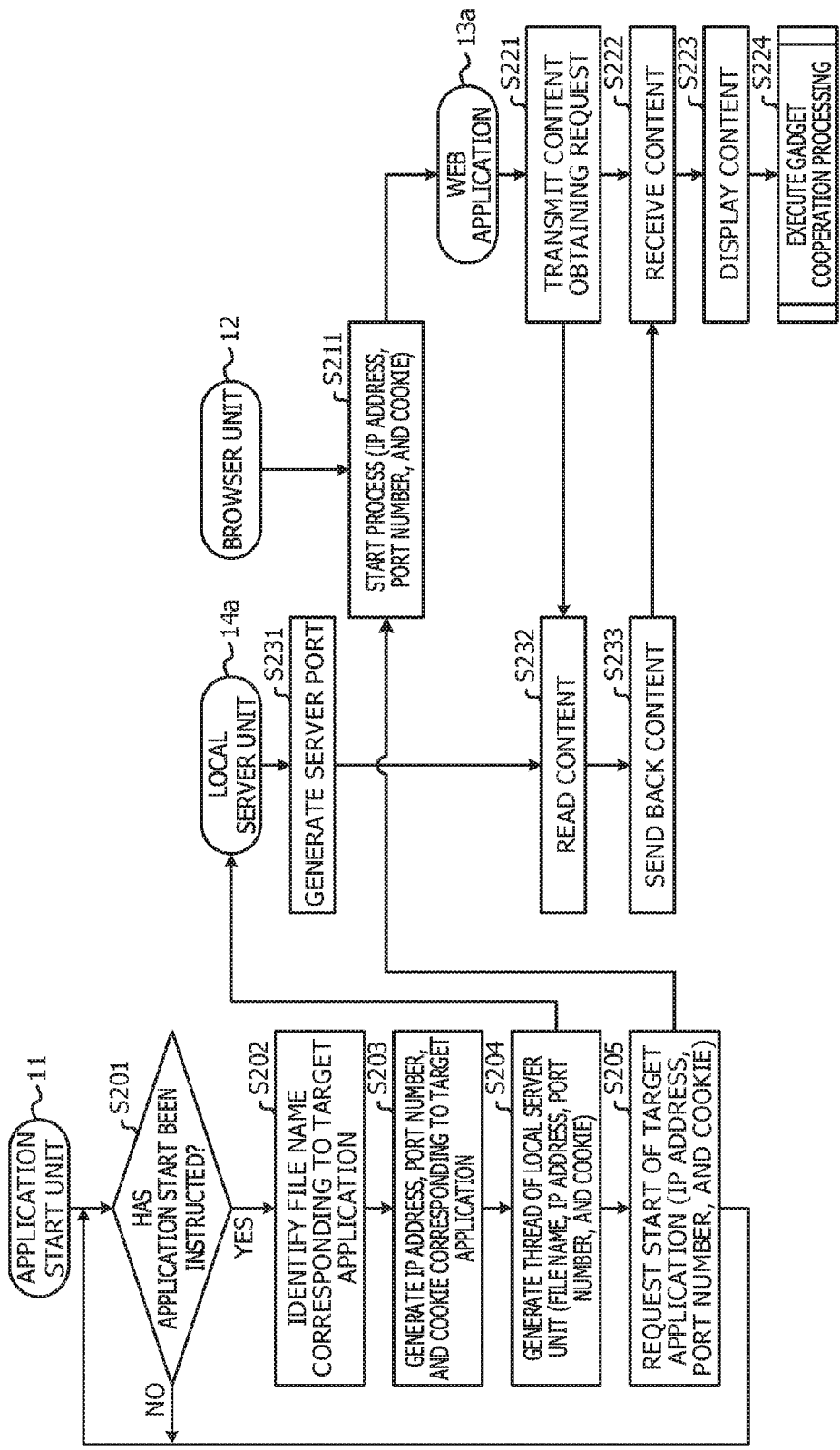
FIG. 12 is a diagram illustrating an example of a processing procedure of start processing of a Web application.

A processing procedure executed in the operation mode is described below. First, start processing of a Web application 13 that cooperates with a gadget 30 is described. FIG. 12 is a diagram illustrating an example of a processing procedure of the start processing of a Web application.

For example, when a start instruction of a Web application 13 related to an icon displayed on the display device 111 of the user terminal 10 is input by selection of the icon (Yes in S201), the application start unit 11 identifies the identification name of a storage location of content data of the Web application 13 that is the start target (here, the Web application 13a) (S202). The identification name of the storage location is, for example, a file name or a folder name. Here, it is assumed that the file name of an archive file that stores the content data is used as the identification name of the storage location. The file name is stored in the user terminal 10 so as to be associated with the icon of the Web application 13.

After that, the application start unit 11 generates an IP address, a port number, and a Cookie corresponding to the Web application 13a (S203). The IP address may be shared between the respective Web applications 13. The values of the port numbers are assigned so as not to duplicate between the respective Web applications 13. The Cookie is information such as a password, which is used to authenticate the Web application 13a. Thus, the values of the Cookies are generated so as not to duplicate between the respective Web applications 13. The IP address and the port number corresponding to the Web application 13a respectively correspond to the IP address and the port number for the content data of the Web application 13a.

After that, the application start unit 11 generates a thread of the local server unit 14a corresponding to the Web application 13a (S204). The file name that has been identified in Step S202, and the IP address, the port number, and the Cookie that have been generated in Step S203 are set to the local server unit 14a. Due to the startup, the local server unit 14a generates (opens) a server port corresponding to the set IP address and port number (S231), and waits for access to the server port.

After that, the application start unit 11 specifies the IP address, the port number, and the Cookie of the Web application 13a, and requests the browser unit 12 to start the Web application 13a (S205).

The browser unit 12 generates a process that functions as the Web application 13a, in response to the start request of the Web application 13a (S211). The IP address, the port number, and the Cookie of the Web application 13a are set to the process. The process is a sub-process of the process as the browser unit 12. Thus, the process may be a part of the browser unit 12 (part that functions as the Web application 13a in the browser unit 12). However, for convenience, the processing executed by the process is described below so that the Web application 13a is assumed to be an execution subject. Each of the Web applications 13 may be started as a thread. Whether the browser unit 12 starts a process or a thread for each of the Web applications 13 depends on the implementation of the browser unit 12.

Due to the startup, the Web application 13a transmits an obtaining request of content data (HTTP request) to the server port related to the IP address and the port number that have been set by the browser unit 12 (S221). When the local server unit 14a receives the obtaining request through the server port, the local server unit 14a reads content data from a file having the file name that has been set in Step S204 (S232). When the file name corresponds to an archive file, content data is read from a file group that has been archived in the archive file. After that, the local server unit 14a sends a response including the read content data (HTTP response) back to the Web application 13a (S233). The Cookie that has been set to the Web application 13a may be included in the obtaining request in Step S221. The local server unit 14a may send back the content data when the Cookie is matched with the Cookie that has been set to the local server unit 14a.

When the Web application 13a receives the content data (S222), the Web application 13a causes the image of the Web application 13a to be displayed based on the content data (S223). After that, the Web application 13a starts cooperation processing with the gadget 30 (S224).

Figure 13:
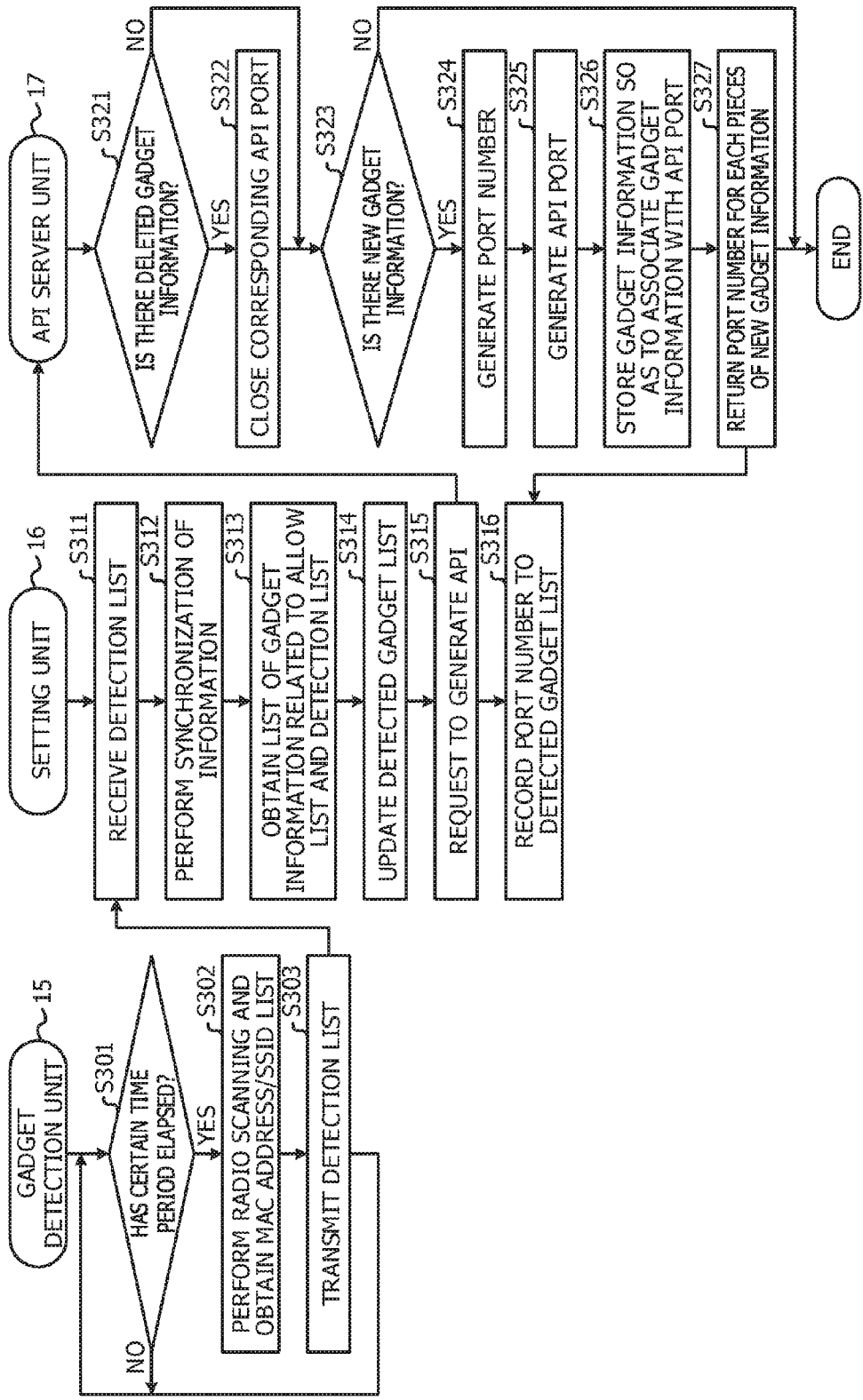
FIG. 13 is a diagram illustrating an example of a processing procedure executed at the time of detection of a gadget.

A processing procedure executed after a gadget 30 has been detected is described below. FIG. 13 is a diagram illustrating an example of the processing procedure executed after a gadget has been detected.

When a certain time period has elapsed (Yes in S301), the gadget detection unit 15 executes radio scanning (S302). In the radio scanning, a beacon that is to reach the user terminal 10 is detected from among the beacons that have been respectively transmitted from the gadgets 30. The format of the beacon of each of the gadgets 30 may be different depending on a connection method or the like corresponding to the gadget 30. As a result of the radio scanning, a list of a SSID, a MAC address, and the like of the gadget 30 that is the transmission source of the beacon (hereinafter referred to as "detection list") is obtained, for each of the detected beacons. After that, the gadget detection unit 15 transmits the detection list to the setting unit 16 (S303).

FIG. 14 is a diagram illustrating an example of a detection list. As illustrated in FIG. 14, the detection list included a connection method, an SSID, a password, and a MAC address, for each of the detected gadgets 30. However, for the gadget 30 in which the SSID or the password is not included in the beacon, the value of the SSID or the password is not valid.

The beacon that has been transmitted by the expansion device 30z (FIG. 9) is also detected in Step S302. This is why the expansion device 30z that has been registered in the registration mode may not be located within a range in which communication with the user terminal 10 is available, at the present time. Thus, information included in the beacon of the expansion device 30z is also caused to be included in the detection list. For example, in the detection list illustrated in FIG. 14, the third record is a record corresponding to the expansion device 30z.

When the setting unit 16 receives the detection list (S311), the setting unit 16 performs synchronization with the cooperation management server 20 for the allow list and the gadget list information (S312). For example, the setting unit 16 transmits an obtaining request of the allow list and the gadget list information, which includes the terminal ID of the user terminal 10, to the cooperation management server 20. The terminal ID is identification information for each of the user terminals 10, and is stored, for example, in the auxiliary storage device 103. The information transmission unit 21 of the cooperation management server 20 sends back an allow list corresponding to the user terminal 10, from among the allow lists stored in the allow list storage unit 24.

FIG. 15 is a diagram illustrating a configuration example of the allow list storage unit. As illustrated in FIG. 15, the allow list storage unit 24 stores information indicating a gadget 30 allowed to cooperate with the user terminal 10 of each terminal ID so as to associate the information with the terminal ID. That is, a cell to which "○" is recorded indicates that all of the Web applications 13 of the user terminal 10 related to the line to which the cell belongs are allowed to cooperate with the gadget 30 related to the column to which the cell belongs. In addition, a cell to which "○ (merely XXX)" is recorded indicates that merely a Web application 13 corresponding to "XXX" from among the Web applications 13 of the user terminal 10 related to the line to which the cell belongs is allowed to cooperate with the gadget 30 related to the column to which the cell belongs. In "XXX", pieces of identification information of a plurality of Web applications 13 may be included. In addition, a cell to which "x" is recorded indicates all of the Web applications 13 of the user terminal 10 related to the line to the cell belongs are not allowed to cooperate with the gadget 30 related to the column to which the cell belongs.

In Step S312, the information transmission unit 21 sends back an allow list related to the line corresponding to the terminal ID included in the obtaining request of the information.

In addition, FIG. 16 is a diagram illustrating a configuration example of the gadget list storage unit. As illustrated in FIG. 16, the gadget list storage unit 25 stores pieces of gadget information, for each of the gadgets 30. In the gadget information, a driver name, a SSID, a password, a MAC address, and a connection method are included.

The driver name is an identification name of the gadget 30, and is also an identification name of the driver corresponding to the gadget 30. The SSID is an SSID for the gadget 30. The password is a password for the gadget 30. The MAC address is a MAC address of the gadget 30. The connection method is a connection method with the gadget 30 through wireless communication. "BLT" in the connection method indicates Bluetooth.

In Step S312, the information transmission unit 21 sends back the gadget list information stored in the gadget list storage unit 25 and a file of the driver, which is identified by the driver name of each of the pieces of gadget information. A list of the SSID or the MAC address of the detected gadget 30 may be included in the obtaining request from the user terminal 10. The information transmission unit 21 may send merely a driver and gadget information corresponding back to the MAC address or the SSID.

The setting unit 16 stores the allow list in the allow list cache unit 121, and stores the gadget list information and the driver group in the gadget list cache unit 122. A record related to the expansion device 30z may not be included in the allow list and the gadget list information. In the embodiment, this is why the registration processing is executed for the expansion device 30z, so that the reliable expansion device 30z has been checked in the registration mode.

Before the allow list and the gadget list information are sent back, the terminal authentication unit 22 performs authentication related to the obtaining request, with reference to the terminal information storage unit 23. When the authentication is performed successfully, the allow list and the gadget list information are sent back.

FIG. 17 is a diagram illustrating a configuration example of the terminal information storage unit. As illustrated in FIG. 17, the terminal information storage unit 23 stores an authentication scheme and authentication information so as to associate the authentication scheme and the authentication information with a terminal ID. The authentication scheme indicates a scheme of the authentication. The authentication information is information used in the authentication based on the authentication scheme. For example, in the example illustrated in FIG. 17, whether a Rivest Shamir Adleman (RSA) key included in the user terminal 10 corresponds to a public key that has been registered to the authentication information is verified by "challenge and response".

After that, the setting unit 16 obtains a list of pieces of gadget information related to the gadgets 30 each of which is allowed to cooperate with one of the Web applications and each of which includes a record corresponding to the detection list in the allow list stored in the allow list cache unit 121, from the gadget list cache unit 122 (S313). At that time, the setting unit 16 obtains registration information including one of the SSID and the MAC address included in the detection list, from among the pieces of registration information stored in the registration information storage unit 123, and adds the registration information to the list of the gadget information. Hereinafter, the registration information that has been added to the list is also referred to as gadget information. However, in the expansion device 30z, a one-time code included in the beacon that has been detected in Step S302 may be verified by a common key included in the registration information. For example, whether the one-time code included in the beacon is matched with the one-time code generated based on the common key may be verified. When the compared one-time codes are not matched with each other, the registration information may not be added to the list of the gadget information.

After that, the setting unit 16 updates the detected gadget list, based on the list that has been obtained in Step S313 (S314). The detected gadget list is a list of pieces of gadget information of the gadgets that are being currently detected.

FIG. 18 is a diagram illustrating a configuration example of a detected gadget list. Each record of the detected gadget list is basically obtained by adding a port number to the items that constitute the gadget information (FIG. 16). The port number is a port number of an API port used to cooperate with the gadget 30. In addition, in a record corresponding to the expansion device 30z, an item of the accommodation allowable number is valid. The accommodation allowable number may be obtained from the beacon of the expansion device 30z. Hereinafter, each of the records of the detected gadget list is referred to as gadget information.

When the processing in Step S314 is executed for the first time, the entire list of the pieces of gadget information that have been obtained in Step S313 is added to the detected gadget list. At that time, the value of the port number of each of the record is vacant. This is why an API port is yet to be generated. In addition, the processing in Step S314 is executed in the second or subsequent time, a record corresponding to gadget information that is included in the list of the pieces of gadget information that has been obtained in Step S313, and that is not included in the detected gadget list is added to the detected gadget list. In addition, a record corresponding to gadget information that is not included in the list of the pieces of gadget information that have been obtained in Step S313, and that is included in the detected gadget list is deleted from the detected gadget list. In addition, in a record corresponding to the expansion device 30z, the accommodation allowable number is updated to the latest value (value included in the beacon that has been detected in Step S302). That is, the processing in Step S314 is executed at certain intervals. Thus, the detected gadget list is updated at certain intervals. The setting unit 16 stores the latest detected gadget list, for example, in the memory 102.

After that, the setting unit 16 requests the API server unit 17 to generate an API corresponding to the gadget 30 (S315). In the request, the gadget information that has been newly added to the detected gadget list and the gadget information that has been deleted from the detected gadget list are specified.

When there is gadget information that has been deleted from the detected gadget list (Yes in S321), the API server unit 17 closes an API port having the port number included in each of the pieces of gadget information, in response to the generation request of an API (S322). In addition, when there is gadget information that has been added to the detected gadget list (Yes in S323), the API server unit 17 generates a port number corresponding to each of the pieces of the gadget information (S324). It is only sufficient that the port number has a value that does not overlap with the port number of the API port that is valid even at the present time. In addition, when a plurality of port numbers is generated in Step S324, it is only sufficient that the generated port numbers have values that do not overlap with each other.

After that, the API server unit 17 generates an API port for each of the port numbers that have been generated in Step S324 (S325). At that time, the same IP address as the IP address of the server port of each of the local server units 14 is assigned to the corresponding generated API port. After that, the API server unit 17 stores gadget information corresponding to the API port that has been generated in Step S325, for example, in the memory 102 so as to associate the gadget information with the API port (S326). In addition, the API server unit 17 associates a Cookie that has been generated by the application start unit 11 for a Web application 13 allowed to cooperate with the gadget related to the gadget information corresponding to the generated API port, with the generated API port. The Web application 13 allowed to cooperate with the gadget related to the gadget information corresponding to the generated API port may be identified based on the allow list.

After that, the API server unit 17 returns a response including the port number of the API port for each of the pieces of gadget information that have been newly added to the detected gadget list, to the setting unit 16 (S327). The setting unit 16 records a port number corresponding to each of the pieces of gadget information included in the response, to the detected gadget list so as to associate the port number with each of the pieces of gadget information (S316).

Figure 19:
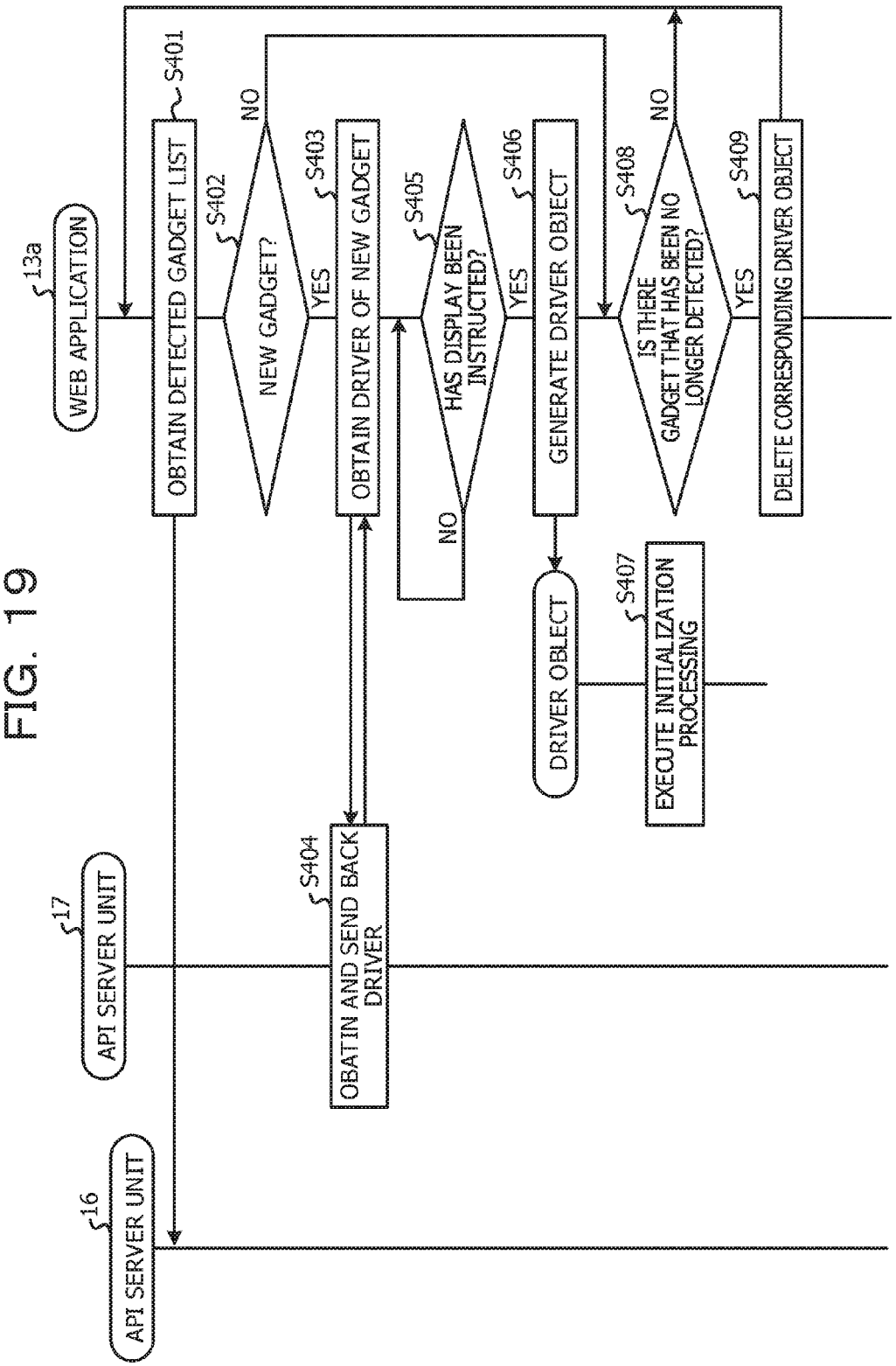
FIG. 19 is a diagram illustrating an example of a processing procedure of first cooperation processing.

The processing in Step S224 of FIG. 12 is described below in detail. FIG. 19 is a diagram illustrating an example of a processing procedure of first cooperation processing. FIG. 19 illustrates processing executed after the processing in Step S223 of FIG. 12, so that, for convenience, it is assumed that the Web application 13 in FIG. 19 is the Web application 13a. However, the processing procedure illustrated in FIG. 19 may be executed by the respective running Web applications 13 in parallel.

In Step S401, the Web application 13a obtains the latest detected gadget list from the setting unit 16. At that time, the setting unit 16 extracts merely the gadget information corresponding to the gadget 30 allowed to cooperate with the Web application 13a, from the detected gadget list, based on the allow list.

After that, the Web application 13a determines the presence or absence of gadget information that is included in the currently-obtained detected gadget list and not included in the detected gadget list that has been previously obtained in Step S401 (S402). That is, the Web application 13a determines the presence or absence of new gadget information.

When there is new gadget information (Yes in S402), the Web application 13a transmits an obtaining request of a driver, to an API port having the port number included in each of the pieces of gadget information (S403). The API server unit 17 obtains a driver having a driver name included in gadget information associated with each of the API ports, based on the driver name, and sends back the driver to the Web application 13a (S404). In Steps S403 and S404, a plurality of drivers may be obtained.

FIG. 20 is a diagram illustrating a configuration example of a driver. As illustrated in FIG. 20, each of the drivers includes items of a driver name, a connection method, access information, a program part, a usage protocol, and environment information. In FIG. 20, for convenience, the contents of four drivers are illustrated as examples.

The driver name is an identification name of the driver, and is also an identification name of the gadget 30 corresponding to the driver. The connection method is a connection method (communication method) that corresponds to the gadget 30 corresponding to the driver. The access information is information such as an SSID, a password, or a MAC address, which is desired to access the gadget 30 corresponding to the driver. The program part is a program code that causes the Web application 13 to call the API port and is used to transmit, to the API server unit 17, information desired to call an API published by the gadget 30 as a result of the calling. In the embodiment, the program part is implemented by JavaScript. The usage protocol is a communication protocol used when the program part of the driver causes the Web application 13 to call the API port. The base program information is information indicating software environment desired to cooperate with the gadget 30 using the driver.

After that, the Web application 13a waits for an input of a display instruction of an icon for each of the gadgets 30 related to the new gadget information (S405). When a display instruction of the icon is input by the user (Yes in S405), the Web application 13a generates an object representing a driver for the gadget 30 (hereinafter referred to as "driver object"), for each of the gadgets 30 related to the new gadget information (S406). That is, the driver object is generated for each of the pieces of gadget information included in the detected gadget list. The corresponding gadget information, driver, and a Cookie set to the Web application 13a are set to each of the driver objects. In addition, each of the driver objects is associated with an API port having a port number included in the corresponding gadget information.

When each of the driver objects is generated, the driver object executes the initialization processing (S407). An icon of the driver corresponding to each of the driver objects is displayed by the initialization processing.

Figure 21:
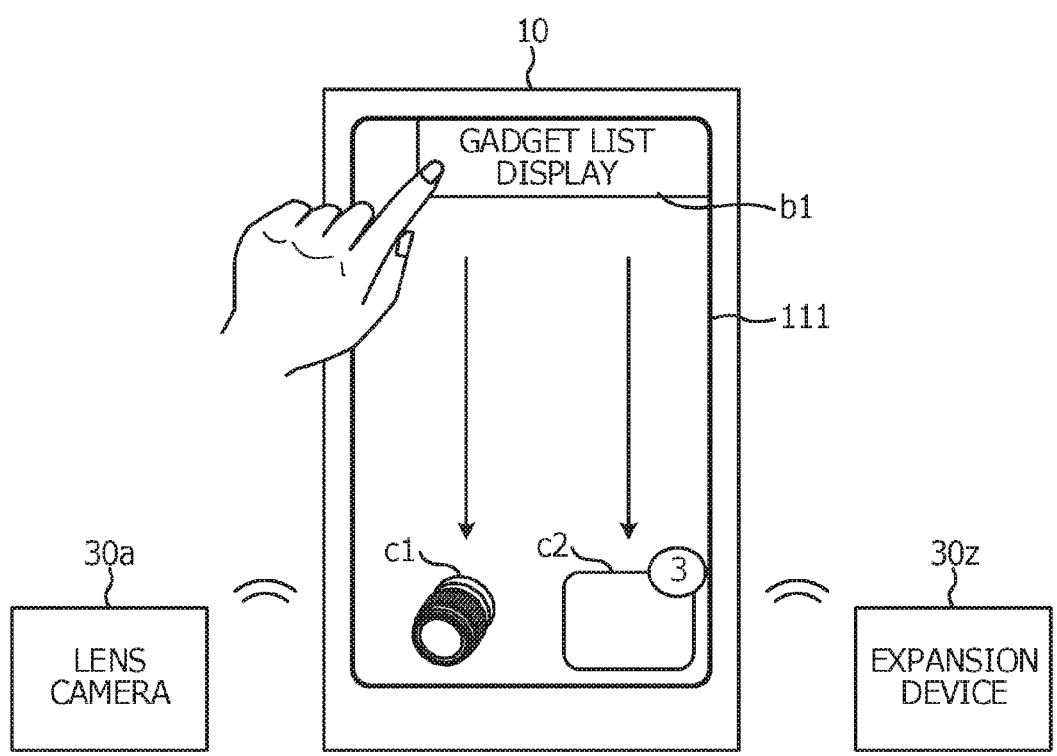
FIG. 21 is a diagram illustrating a first display example of an icon corresponding to a driver.

FIG. 21 is a diagram illustrating a first display example of an icon corresponding to a driver. In FIG. 21, an example is illustrated in which the gadget 30a that is a lens camera that is compatible with WiFi and the expansion device 30z are detected.

For example, in Step S405, a button b1 used to accept a display instruction of an icon is displayed. When the button b1 is selected, an icon c1 corresponding to the gadget 30a and an icon c2 corresponding to the expansion device 30z are displayed in the bottom of the screen, for example, so as to fall from the upper part of the screen. A numeric value at the upper right of the icon c2 indicates the accommodation allowable number.

Alternatively, output of information indicating an operation method of the expansion device 30z may be performed.

FIG. 22 is a diagram illustrating a second display example of an icon corresponding to a driver.

In FIG. 22, an example in which a message mes1 is displayed is illustrated. The message mes1 may be displayed by a driver object corresponding to the expansion device 30z. For example, the display processing of the message mes1 may be included in the initialization processing of the driver object. Alternative, the content of the message mes1 may be output as an audio. The output form of the message mes1 may follow the setting for the user terminal 10.

Each driver object changes a part of the program part that has been set to the driver object, depending on the current environment, in the initialization processing. For example, the IP address of the current API server unit 17 and a port number included in gadget information that has been set by the driver object are applied to the program part.

FIG. 23 is a diagram illustrating an example of the definition content of a program part of a driver. In FIG. 23, a program part 510 is a driver corresponding to the gadget 30a that is a lens camera that is compatible with WiFi.

In "ip port" of a description 511 of the program part 510, "ip" is replaced with the IP address of the API server unit 17, in the initialization processing. In addition, "port" is replaced with the port number of an API port corresponding to the driver included in the program part 510, in the initialization processing. That is, the IP address and the port number do not have static values, so that the program part 510 is described by not a specific value but a symbol.

A description 512 indicates that the name of one method in a method group that is provided by the program part 510 is "Take photo". A description 513 indicates that an access destination when the method is executed is an URL specified in parentheses. In the URL, the value of "this.ip" is an IP address that has been applied to "ip" in the description 511. In addition, in the URL, the value of "this.port" is a port number that has been applied to the port in the description 511. A description 514 indicates that the information in the parentheses is a transmission target to the URL that has been specified in the description 513 (that is, the API port). The parameter in the parentheses is information constituting the API of the gadget 30a.

A description 515 indicates that the name of one method in the method group provided by the program part 510 is "StartRecording".

Returning to FIG. 19, following Step S406, the Web application 13a determines the presence or absence of gadget information that is included in the detected gadget list that has been previously obtained in Step S401, and is not included in the currently-obtained detected gadget list (S408). That is, the Web application 13a determines the presence or absence of the gadget 30 that has been no longer detected. When there is the corresponding gadget information (Yes in S408), the Web application 13a deletes a driver object corresponding to the gadget information (S409). When the driver object is deleted, an icon of the driver corresponding to the driver object is deleted.

Figure 24:
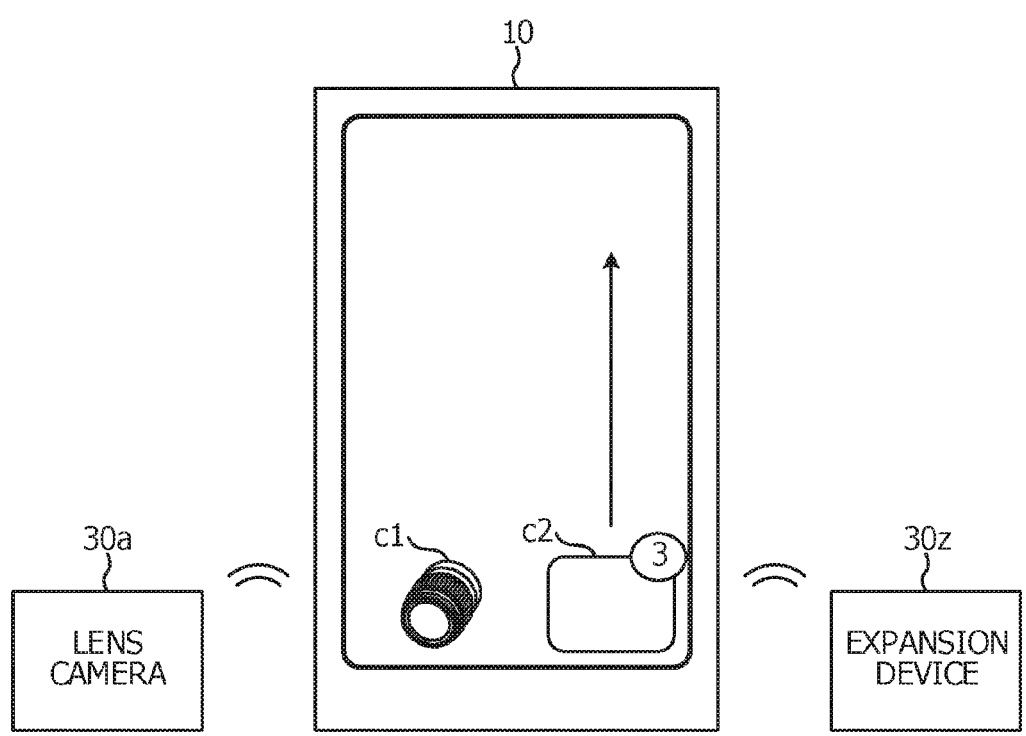
FIG. 24 is a diagram illustrating an example in which an icon is deleted with deletion of a driver object.

FIG. 24 is a diagram illustrating an example in which an icon is deleted with deletion of a driver object. In FIG. 24, an example is illustrated in which the icon c2 corresponding to the expansion device 30z is raised and deleted, as a result of non-detection of the expansion device 30z.

In FIG. 19, the processing in Step S401 and the subsequent steps is executed repeatedly. For example, the processing in Step S401 and the subsequent steps may be executed at certain intervals.

Figure 25:
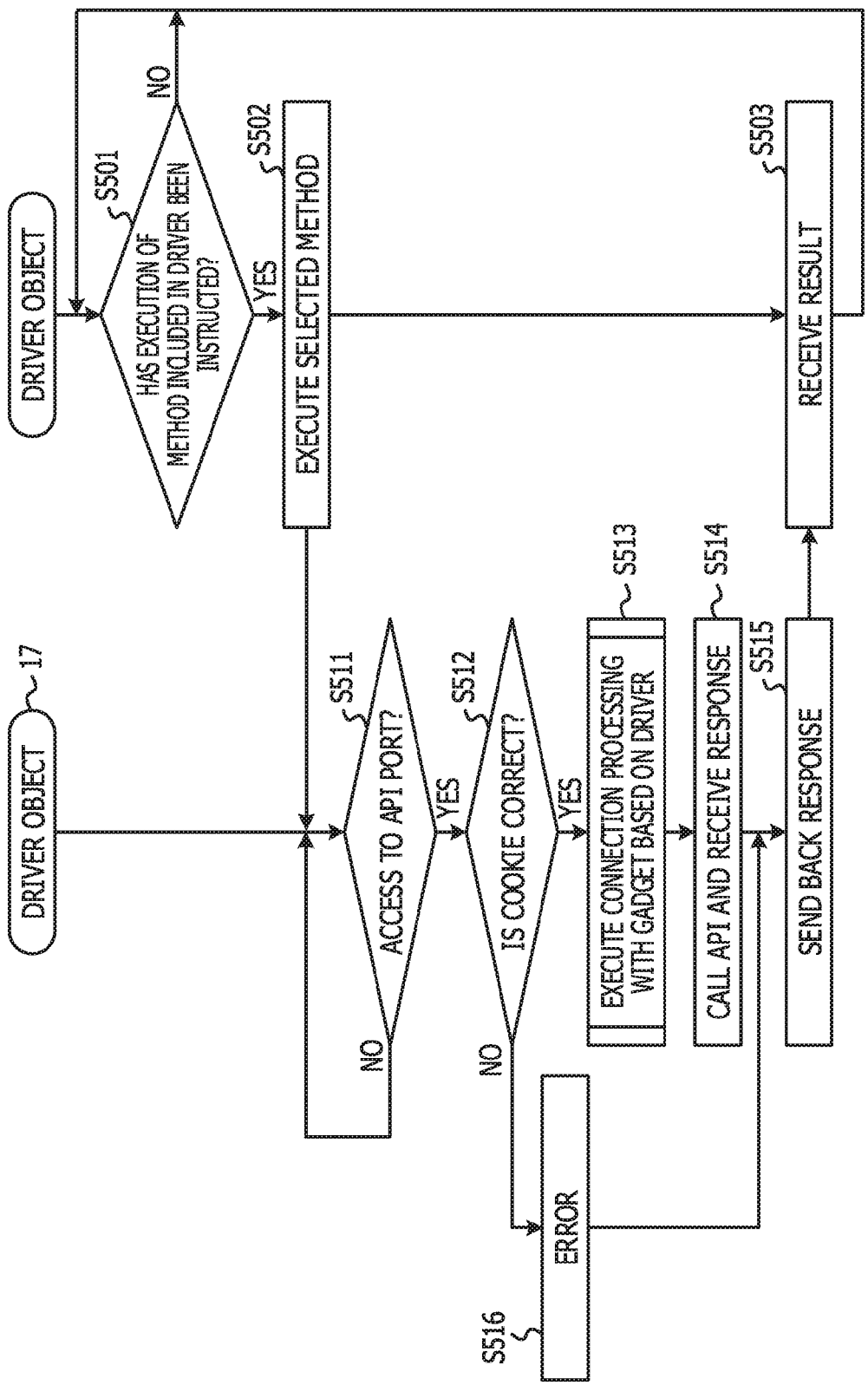
FIG. 25 is a diagram illustrating an example of a processing procedure of second cooperation processing.

Processing executed in parallel with the processing of FIG. 19 in Step S224 of FIG. 12 is described below. FIG. 25 is a diagram illustrating an example of a processing procedure of second cooperation processing.

When input of an execution instruction of one of the methods included in the program part of the driver is performed so that an icon of the driver is operated (Yes in S501), the driver object corresponding to the driver executes the selected method (S502).

Figure 26:
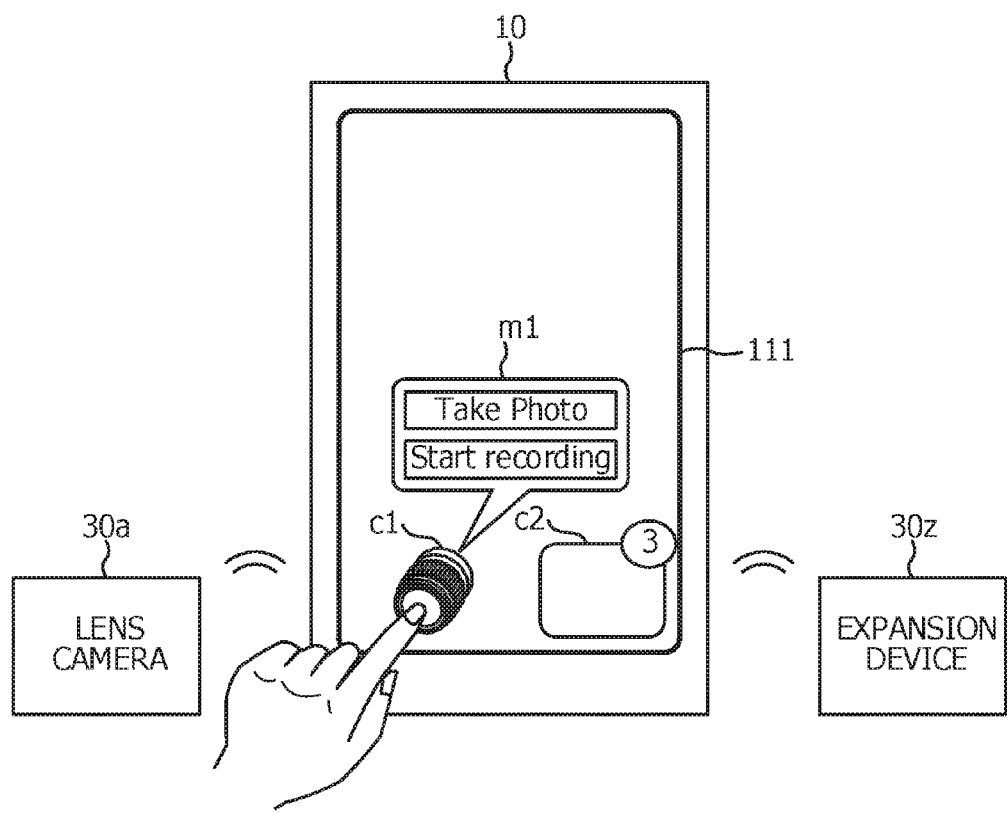
FIG. 26 is a diagram illustrating an operation example of an icon corresponding to a driver.

FIG. 26 is a diagram illustrating an operation example of the icon of the driver. In FIG. 26, an example is illustrated in which the icon c1 is selected, and a menu m1 is displayed. The menu m1 includes the methods included in the program part 510 of the driver corresponding to the icon c1, as menu items. That is, the menu m1 includes a "TakePhoto" method and a "Startrecording" method as the menu items. The user may perform input of an execution instruction of a desired method so as to select the method.

For example, when "Take photo" has been selected, the definition of "Take photo" in the program part 510 of FIG. 23 is executed. As a result, an HTTP request including the parameter that has been specified in the parentheses of the description 514 is transmitted to an API port related to the URL that has been identified in the description 513. The HTTP request includes a Cookie that has been set to the Web application 13a.

When the API server unit 17 receives the HTTP request through one of the opened API port (hereinafter referred to as "target port") (Yes in S511), the API server unit 17 verifies the validity of the Cookie included in the HTTP request (S512). For example, the API server unit 17 determines whether the Cookie included in the HTTP request is matched with one of the Cookies associated with the target port. When the Cookie include in the HTTP request is not matched with any of the Cookies associated with the target port (No in S512), the API server unit 17 detects occurrence of an error (S516). In this case, in Step S516, the API server unit 17 sends back an HTTP response indicating the error.

In addition, when the Cookie included in the HTTP request is matched with one of the Cookies associated with the target port (Yes in S512), the API server unit 17 executes coupling processing with the gadget 30 based on the driver set to the driver object stored so as to be associated with the target port (S513). As a result, the address of the gadget 30 (for example, the IP address or the like) is determined. Therefore, the API server unit 17 calls an API for the gadget 30, based on the parameter included in the HTTP request that has been received in Step S511, and receives a response of the API (S514). In the calling of the API, the address that has been determined in Step S513 is the destination of the API. In addition, the content of the response is different depending on the gadget 30 that is a calling destination of the API and the called API. For example, when an API used to request the lens camera that is compatible with WiFi to capture an image is called, image data obtained as the capturing result may be included in the response.

After that, the API server unit 17 sends back a HTTP response for the HTTP request that has been received in Step S511 (S515). The HTTP response includes a response from the gadget 30. When the driver object receives the HTTP response (S503), for example, the driver object executes processing using the response from the gadget 30, which is included in the HTTP response.

Figure 27:
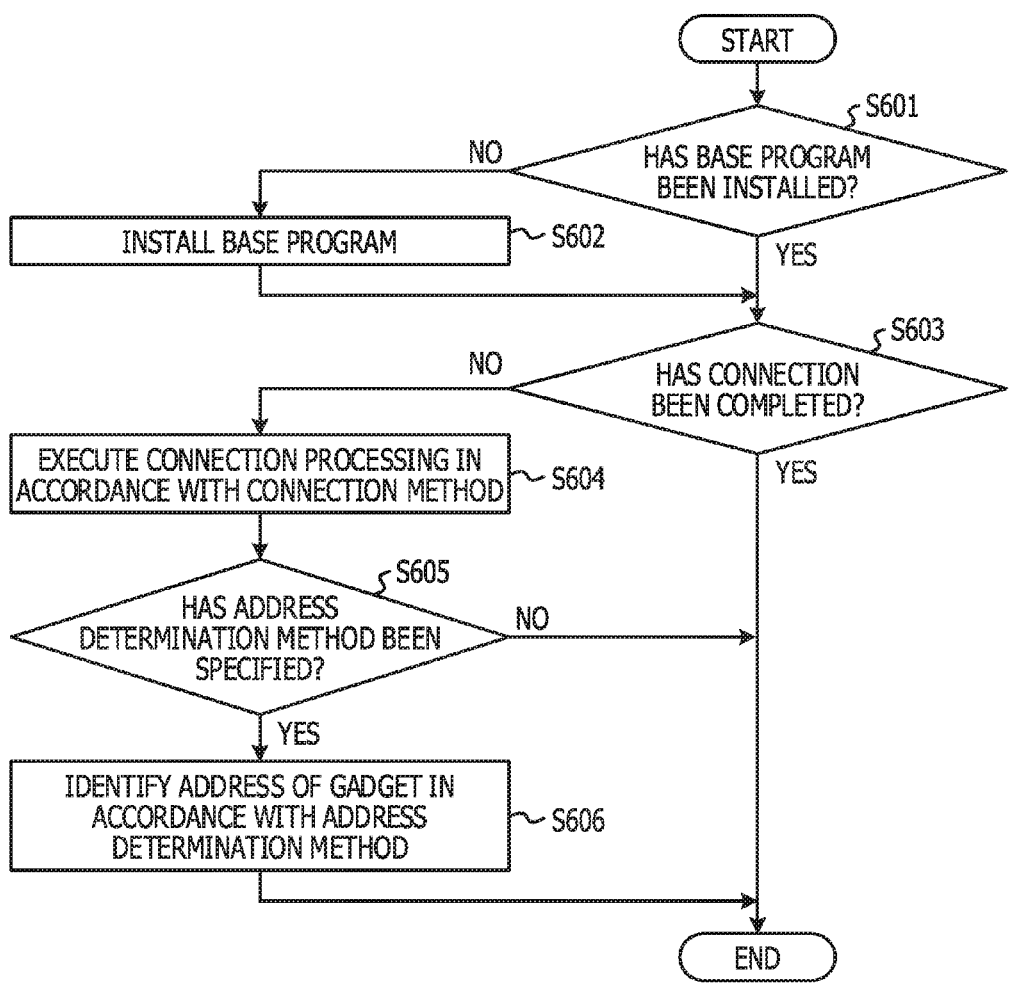
FIG. 27 is a flowchart illustrating an example of a processing procedure of coupling processing with a gadget based on a driver.

The processing in Step S413 is described below in detail. FIG. 27 is a flowchart illustrating an example of a processing procedure of coupling processing with a gadget based on a driver. The driver that is a processing target at the time of calling of the processing of FIG. 27 is referred to as "target driver". In addition, the gadget 30 that is a connection target at the time of calling of the processing of FIG. 27 is referred to as "target gadget".

In Step S601, it is determined whether a base program that has been specified by the target driver has been installed. When a base program is yet to be installed (No in S601), installation of the base program is executed (S602).

After that, it is determined that connection with the target gadget has been completed (S603). When the connection with the target gadget is yet to be completed (No in S603), coupling processing in accordance with the connection method that has been specified by the target driver is executed (S604). For example, when the connection method is "WiFi AP", the connection with the target device is performed based on the SSID and the password.

After that, it is determined whether an address determination method has been specified in the access information of the target driver (S605). The address determination method is a determination method of the address of the target gadget (IP address, MAC address, or the like). When the address determination method has been specified (S605), the address of the target gadget is identified in accordance with the address determination method (S606). The address is used when the API of the target gadget is called.

Figure 28:
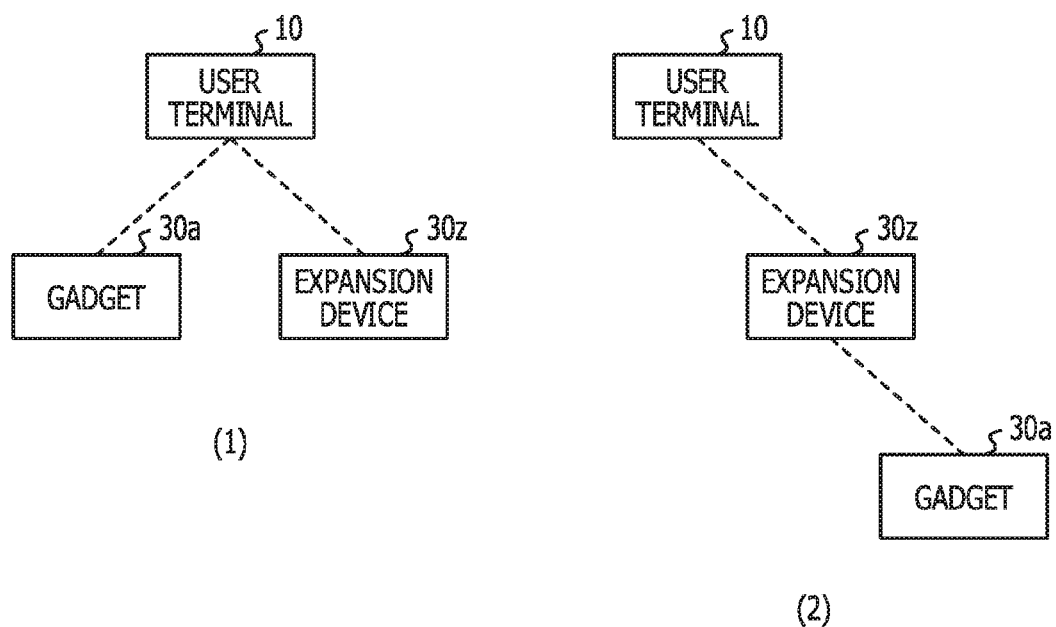
FIG. 28 is a diagram illustrating a change in a connection configuration between a user terminal and gadgets.

A change in a connection configuration between the user terminal 10 and each of the gadgets 30 is described below. FIG. 28 is a diagram illustrating a change in a connection configuration between the user terminal and each of the gadgets. In FIG. 28, (1) corresponds to the state in which the icons c1 and c2 are displayed on the user terminal 10 as illustrated in FIG. 21. That is, in (1), the gadget 30a and the expansion device 30z are directly coupled to the user terminal 10.

In addition, (2) indicates the state in which the gadget 30a transitions under the control of the expansion device 30z (state in which the gadget 30 is accommodated in the expansion device 30z). That is, in (2), the gadget 30a is coupled to the user terminal 10 through the expansion device 30z. First, processing executed when the state of the connection configuration is changed from the state of (1) to the state of (2) is illustrated.

Figure 29:
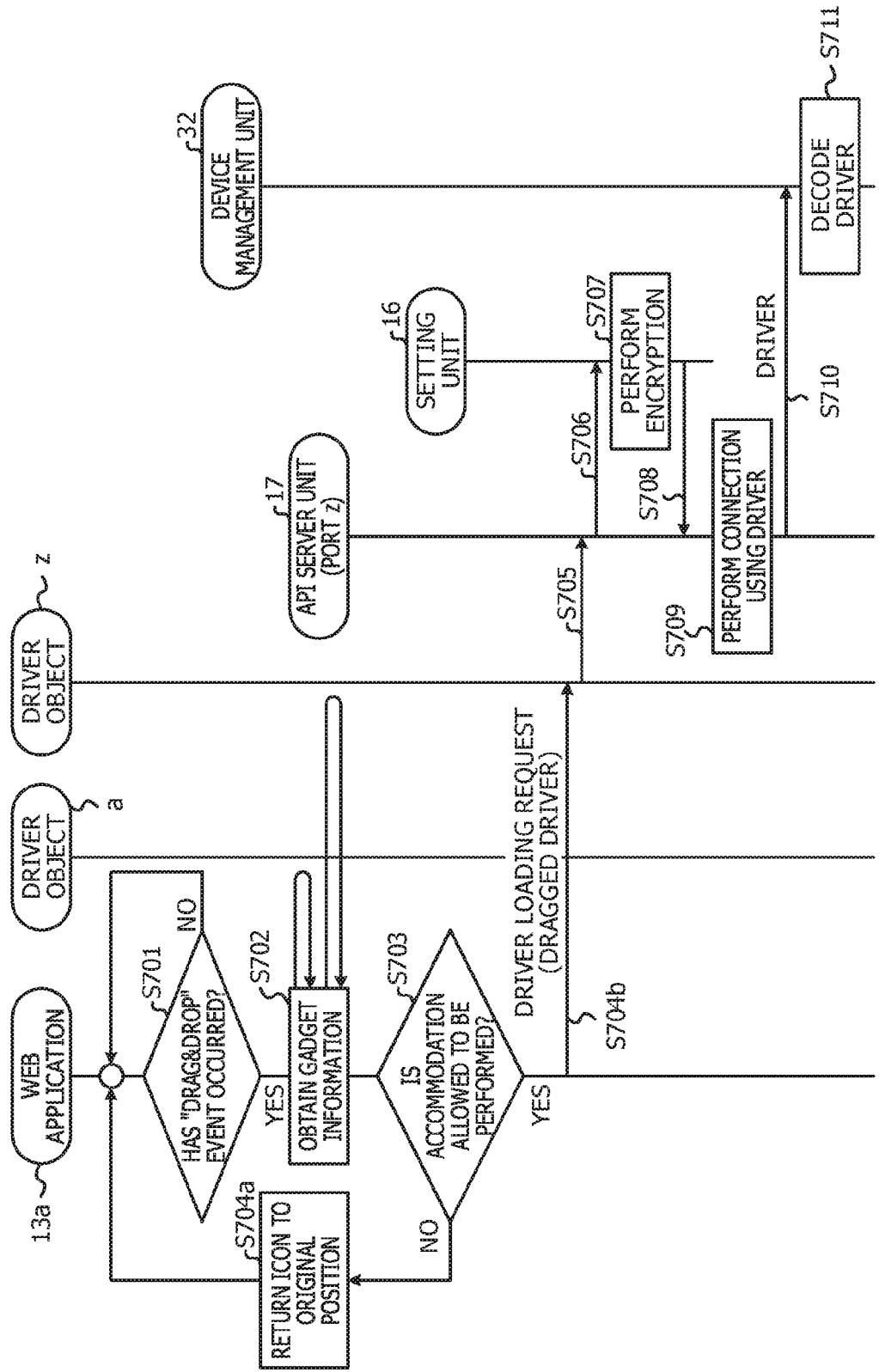
FIG. 29 is a diagram illustrating an example of a processing procedure of change processing of the connection configuration.
Figure 30:
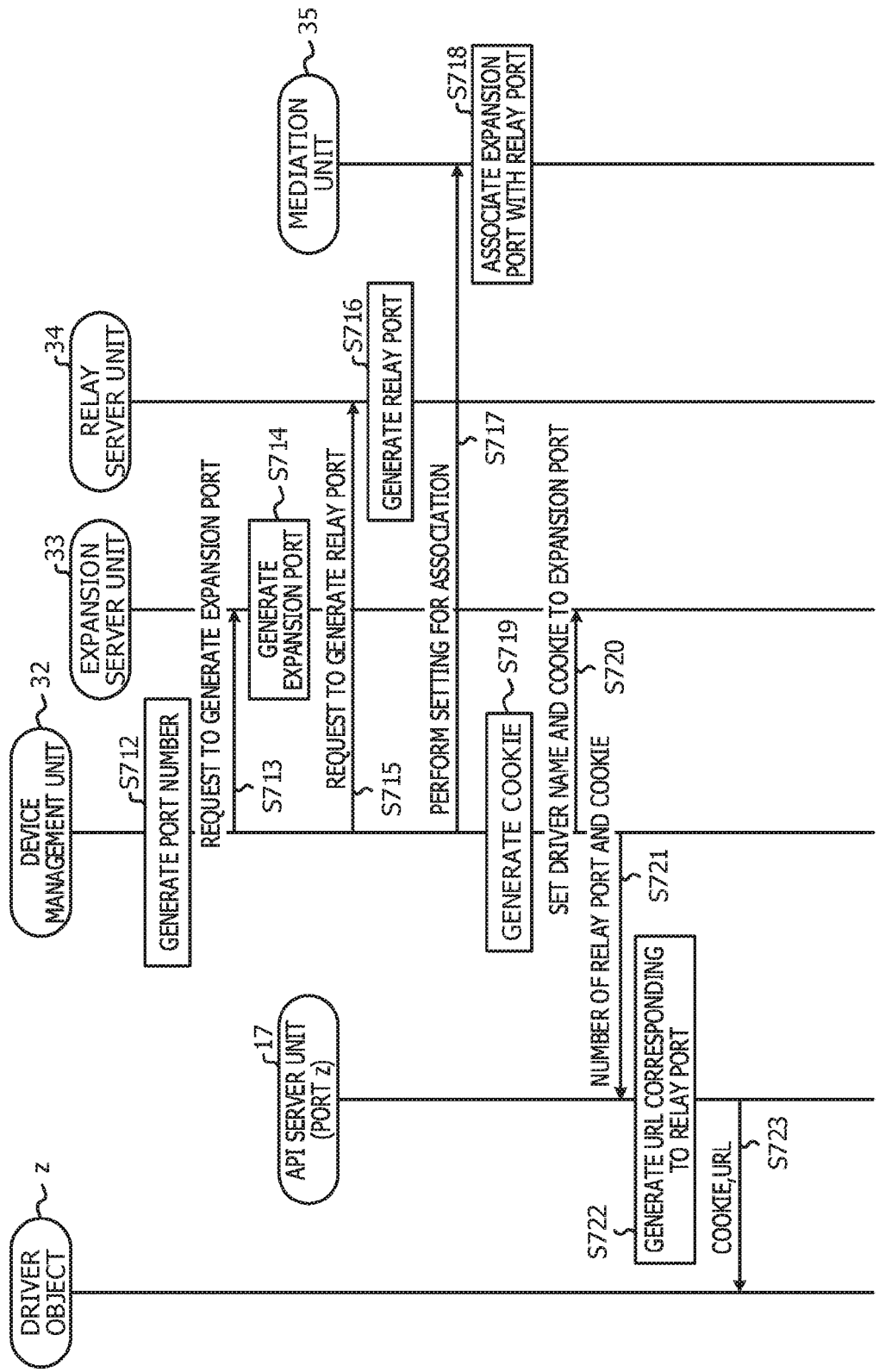
FIG. 30 is a diagram illustrating the example of the processing procedure of the change processing of the connection configuration.
Figure 31:
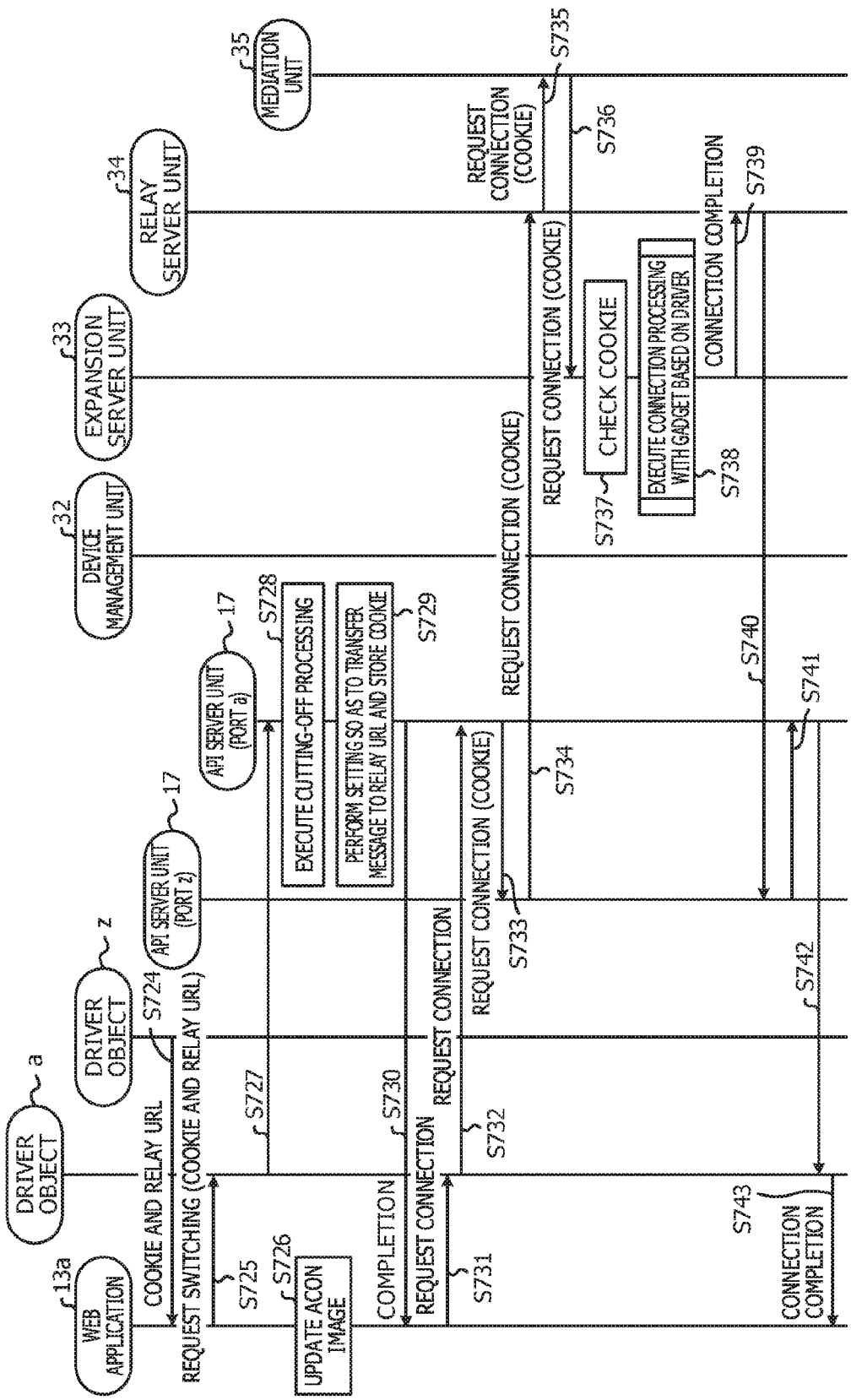
FIG. 31 is a diagram illustrating the example of the processing procedure of the change processing of the connection configuration.

FIGS. 29, 30, and 31 are diagrams illustrating an example of a processing procedure of change processing of the connection configuration. The processing of FIGS. 29, 30, and 31 has a parallel relationship with the processing of FIG. 19. In addition, in the initial state of FIG. 29, as illustrated in FIG. 21, it is assumed that the icons c1 and c2 are displayed on the user terminal 10.

When the user desires to the gadget 30a to transition under the control of the expansion device 30z, the user drags the icon c1 and drops the icon c1 within the area of the icon c2.

Figure 32:
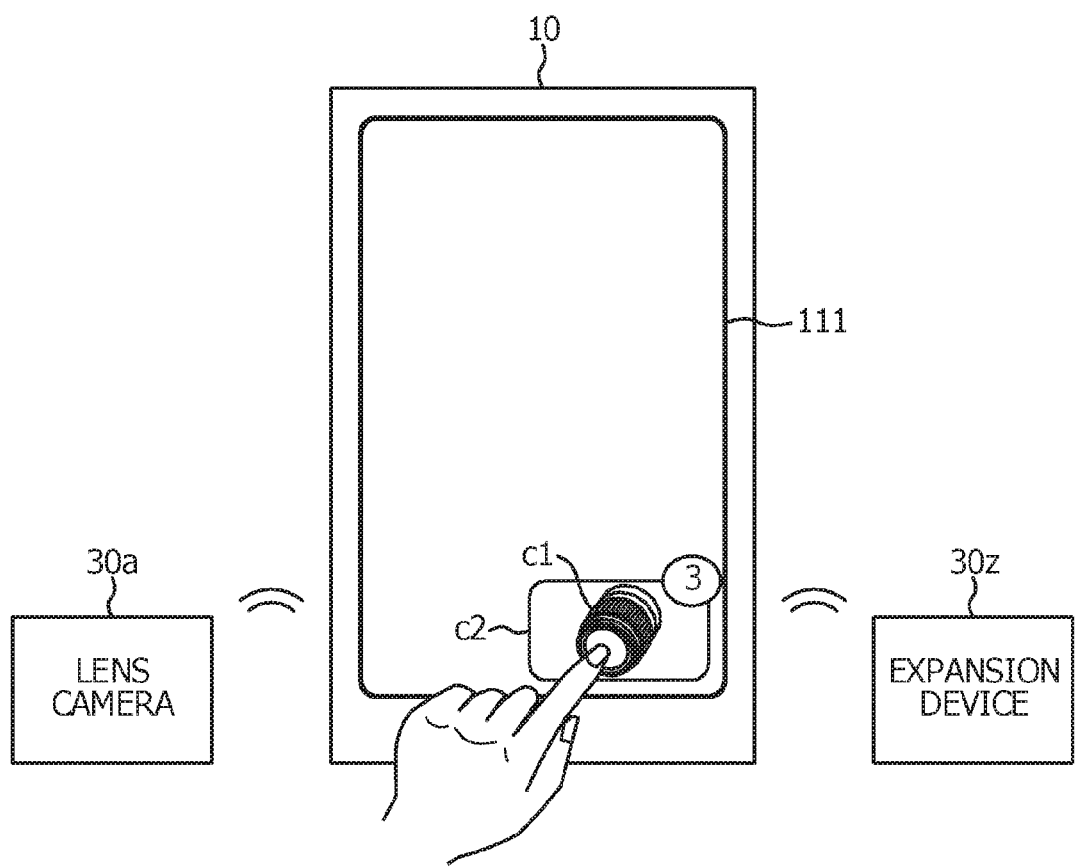
FIG. 32 is a diagram illustrating an example of "drag-and-drop" of an icon.

FIG. 32 is a diagram illustrating an example of "drag-and-drop" of an icon. In FIG. 32, an example is illustrated in which "drag-and-drop" of the icon c1 is performed on the icon c2. Even an operation other than "drag-and-drop" operation may be set as an operation used to cause the gadget 30a to transition under the control of the expansion device 30z as long as the operation for the icon c1 is related to the icon c2. For example, in the state in which the icons c1 and c2 are selected, a transition instruction may be input through a context menu for the icon c1.

When the Web application 13a detects that "drag-and-drop" of the icon c1 is performed on the icon c2 (Yes in S701), the Web application 13a obtains pieces gadget information from a driver object a corresponding to the icon c1 and a driver object z corresponding to the icon c2, respectively (S702). That is, the gadget information corresponding to the dragged driver (gadget 30) and the gadget information corresponding to the driver that is the drop destination (expansion device 30z) are obtained.

After that, the Web application 13a compares the pieces of obtained gadget information, and determines whether the dragged gadget 30a is allowed to be accommodated in the expansion device 30z that is the drop destination (whether the gadget 30a is allowed to be coupled to the expansion device 30z) (S703). For example when the accommodation allowable number corresponding to the connection method of the gadget information of the dragged gadget 30 is one or more in the gadget information of the expansion device 30z that is the drop destination, it is determined that the accommodation is available. When the accommodation allowable number is zero, it is determined that the accommodation is not available. When it is determined that the accommodation is not available (No in S703), the Web application 13a returns the dragged icon c1 to the original position (S704a). When it is determined that the accommodation is available (Yes in S703), the Web application 13a specifies a driver of the gadget 30a, and requests the driver object z to load the driver (S704b).

The driver object z transmits a load request of the driver, which includes the driver of the gadget 30a, to an API port having the port number set to the driver object z (hereinafter referred to as "port z") (S705). The API server unit 17 specifies a MAC address of the gadget information associated with the port z (MAC address of the expansion device 30z) and the driver of the gadget 30a, and requests the setting unit 16 to encrypt the driver (S706). The setting unit 16 encrypts the driver using the common key stored in the registration information storage unit 123 so as to be associated with the MAC address (S707). After that, the setting unit 16 outputs the encrypted driver to the API server unit 17 (S708).

After that, the API server unit 17 performs connection with the expansion device 30z, using access information of the driver corresponding to the port z (driver of the expansion device 30z) (S709). After that, the API server unit 17 transmits the encrypted driver of the gadget 30a, to the device management unit 32 of the expansion device 30z (S710). The MAC address of the user terminal 10 is also notified to the device management unit 32 with the driver.

When the device management unit 32 receives the encrypted driver, the device management unit 32 decodes the driver using the common key stored in the common key storage unit 37 so as to be associated with the MAC address notified with the driver (S711). The device management unit 32 saves the decoded driver, for example, so as to store the decoded driver in a file.

After that, the device management unit 32 generates port numbers of the relay port and the expansion port corresponding to the gadget 30a (S712 of FIG. 30). After that, the device management unit 32 specifies the port number of the expansion port, and requests the expansion server unit 33 to generate the expansion port (S713). The expansion server unit 33 generates the expansion port having the specified port number (S714). After that, the device management unit 32 specifies the port number of the relay port, and requests the relay server unit 34 to generate the relay port (S715). The relay server unit 34 generates the relay port having the specified port number (S716).

After that, the device management unit 32 specifies the port number of the expansion port and the port number of the relay port, and requests the mediation unit 35 to associate the expansion port that has been generated in Step S714 with the relay port that has been generated in Step S716 (S717). The mediation unit 35 stores the correspondence information of the two port numbers in the port correspondence storage unit 38 (S718).

After that, the device management unit 32 generates a Cookie used to authenticate access to the expansion port (that is, the gadget 30a) (S719). After that, the device management unit 32 sets the Cookie and the driver name of the driver stored in Step S711, to the expansion port that has been generated in Step S714 (S720). After that, the device management unit 32 sends the Cookie and the port number of the relay port that has been generated in Step S716 back to the port z of the API server unit 17 (S721). After that, the API server unit 17 generates a URL for the port z, which corresponds to the relay port (S722). The URL is generated, for example, by the following format.

<IP address of the API server unit 17>:<port number of port z>/1

In the above-described URL, the end of "1" is an identifier corresponding to the relay port. Hereinafter, the URL is referred to as "relay URL".

After that, the API server unit 17 returns the Cookie that has been received in Step S721 and the relay URL, to the driver object z (S723). The object z returns the Cookie and the relay URL, to the Web application 13a (S724 of FIG. 31).

The Web application 13a specifies the Cookie and the relay URL and requests the driver object a to switch the connection destination (S725), and updates the display state of the icon c1 (S726). That is, the display of the icon c1 is updated so as to indicate the state in which the gadget 30a is accommodated in the expansion device 30z.

Figure 33:
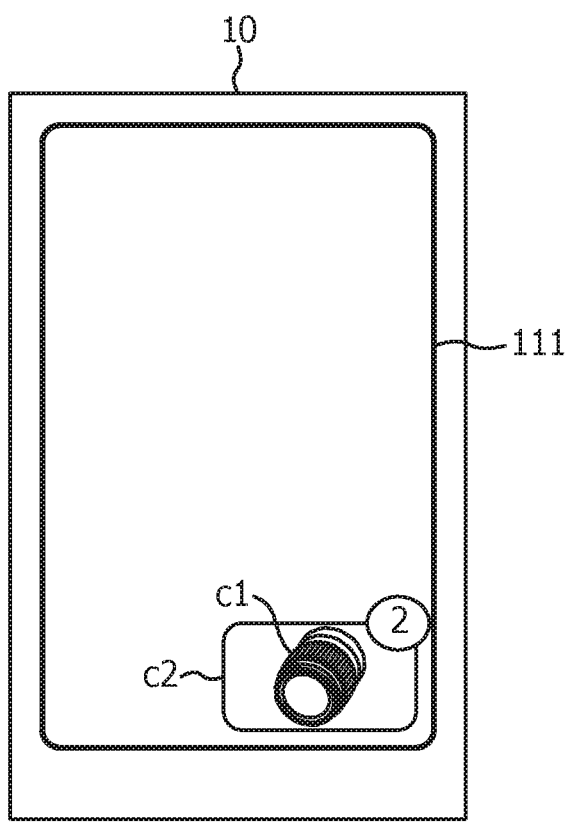
FIG. 33 is a diagram illustrating a display example of an icon, which indicates a state in which a gadget is accommodated in an expansion device.

FIG. 33 is a diagram illustrating a display example of an icon indicating the state in which the gadget is accommodated in the expansion device. As illustrated in FIG. 33, the icon c1 is displayed so as to be superimposed with the icon c2. In the icon c2, the accommodation allowable number is reduced to "2". This is why the gadget 30a has been accommodated in the expansion device 30z.

In addition, the driver object a for which the switching of the connection destination has been requested transmits the switching request of the connection destination, which includes the Cookie and the relay URL, to a port a having the port number included in the gadget information that has been set to the driver object a (S727). The API server unit 17 cuts off the connection with the gadget 30a, for the port a, in response to the switching request (S728). After that, the API server unit 17 performs setting for the port a so that a message for the port a is transferred to the relay URL (S729). In addition, the API server unit 17 stores a Cookie included in the switching request so as to associate the Cookie with the port a. After that, the API server unit 17 notifies the Web application 13a of completion of switching of the connection destination (S730).

The Web application 13a requests the driver object a to perform the connection (with the expansion device 30z), in response to switching completion notification of the connection destination (S731). The driver object a transmits the connection request to the port a having the port number included in the gadget information that has been set to the driver object a (S732). The API server unit 17 specifies the Cookie stored so as to be associated with the port a, in response to the connection request for the port a, and transmits the connection request to the relay URL (S733). This is why the message for the port a is set so as to be transferred to the relay URL. The relay URL is an URL for the port z. Thus, the connection request is received at the port z.

When the connection request destined for the relay URL is received at the port z, the API server unit 17 transmits the connection request to the relay port corresponding to the relay URL (S734). When the relay server unit 34 of the expansion device 30z receives the connection request through the relay port, the relay server unit 34 transfers the connection request to the mediation unit 35 (S735). The mediation unit 35 identifies an expansion port corresponding to the relay port, with reference to the port correspondence storage unit 38, and transfers the connection request to the expansion port (S736). As a result, the connection request is received by the expansion server unit 33.

The expansion server unit 33 checks a Cookie specified in the connection request, against the Cookie that has been set to the expansion port (S737). When the two Cookies are not matched with each other, an error is returned without execution of the subsequent processing. When the two Cookies are matched with each other, the expansion server unit 33 executes the coupling processing with the gadget 30a, based on the driver having the driver name that has been set to the expansion port (S738). As a result, the expansion device 30z is coupled to the gadget 30a. The detailed processing in Step S738 is as described above in FIG. 27.

After that, the expansion server unit 33 sends a response indicating completion of the connection back to the relay port (S739). After that, the relay server unit 34 transfers the response to the port z of the user terminal 10 (S740). The response is notified to the Web application 13a by tracing the transmission channel of the connection request in reverse (S741 to S743).

As described above, the connection configuration between the user terminal 10, the gadget 30a, and the expansion device 30z is as illustrated in (2) of FIG. 28. Even in such a state, the operation as illustrated in FIG. 26 may be performed on the icon c1. For example, when the user selects the "Take Photo" method, the processing in Step S502 of FIG. 25 and the subsequent steps is executed. However, the message destined for the port a is transferred to the relay port of the relay server unit 34 of the expansion device 30z through the port z. In addition, the message is transferred to the expansion port corresponding to the relay port by the mediation unit 35. Thus, in the processing in Step S513 of FIG. 25 and the subsequent steps is executed by the expansion server unit 33. As a result, an API of the gadget 30a corresponding to the "Take Photo" method is called by the expansion server unit 33.

Figure 34:
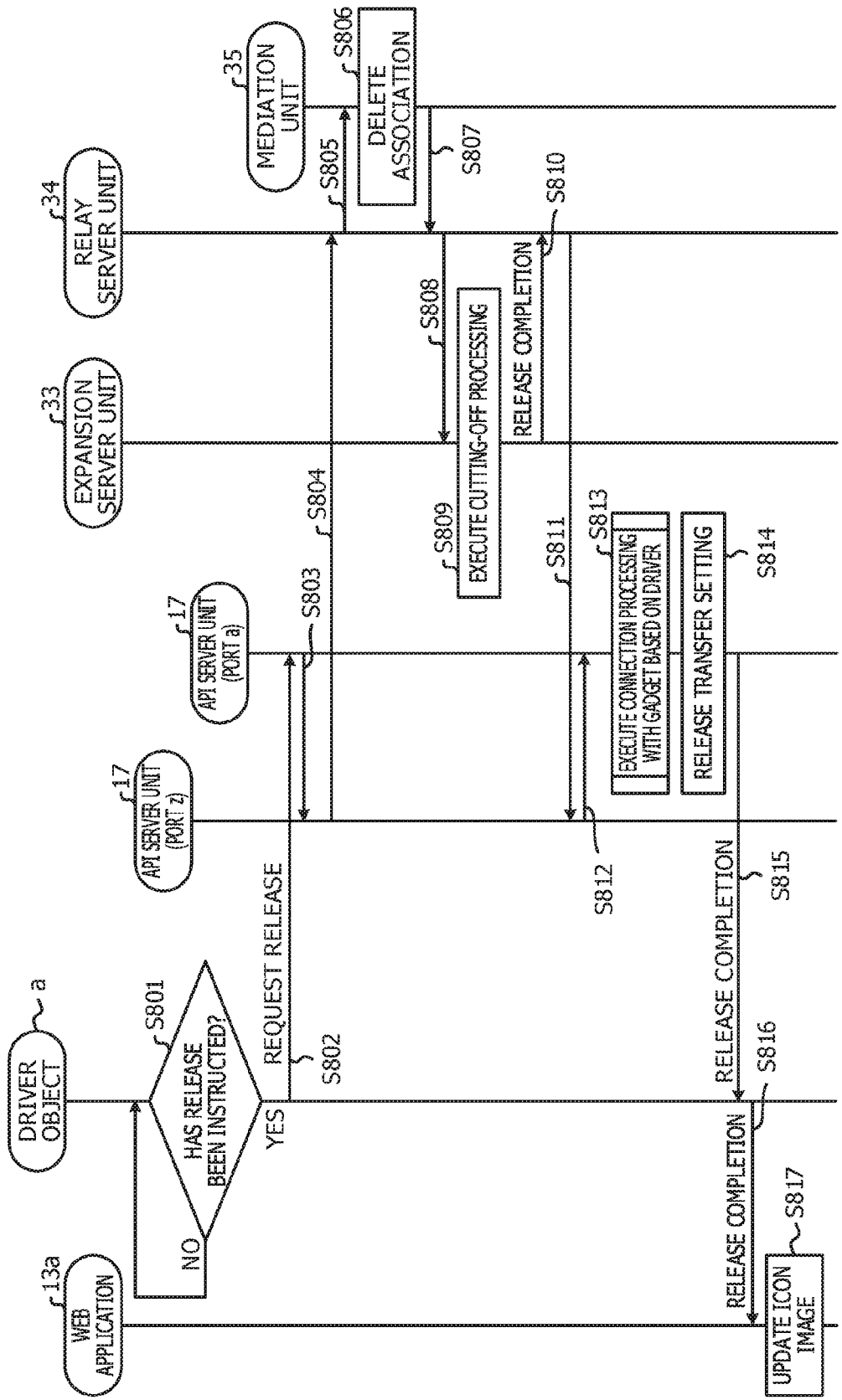
FIG. 34 is a diagram illustrating an example of a processing procedure of return processing of the connection configuration.

Processing executed when the state is returned from the state of (2) to the state of (1) in FIG. 28 is described below. FIG. 34 is a diagram illustrating an example of a processing procedure of return processing of the connection configuration.

When the driver object a detects an input of a release instruction of the accommodation state (Yes in S801), the driver object a transmits a release request to the port a having the port number included in the gadget information that has been set to the driver object a (S802). The input of the release instruction is performed, for example, as illustrated in FIG. 35.

Figure 35:
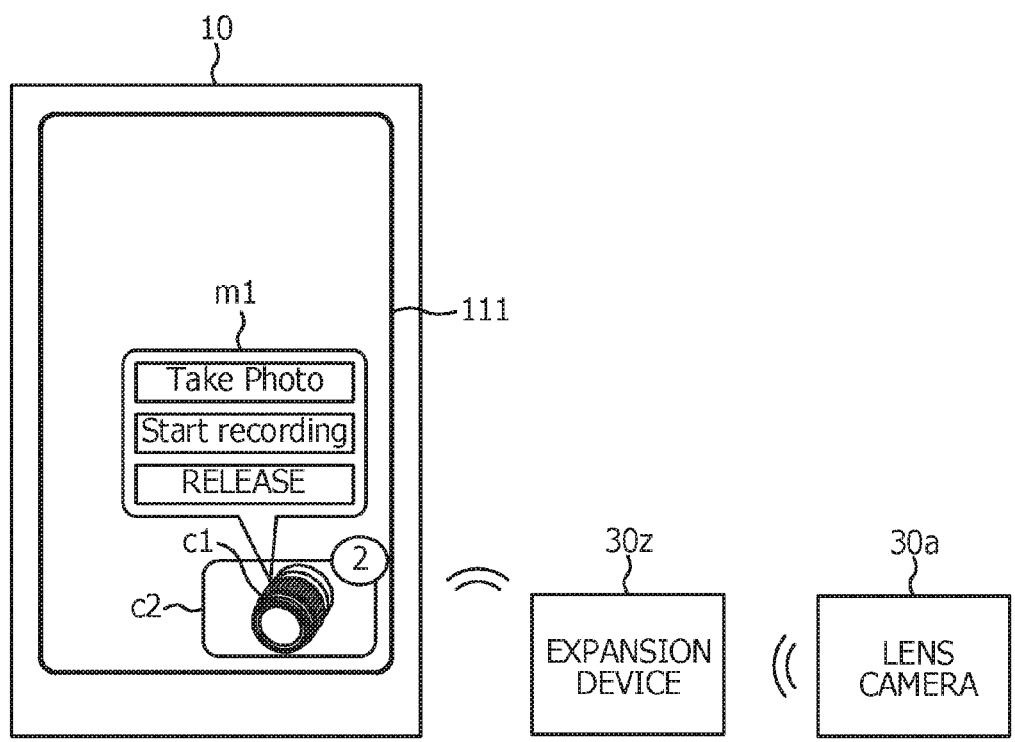
FIG. 35 is a diagram illustrating an input example of a release instruction.

FIG. 35 is a diagram illustrating an input example of a release instruction. In FIG. 35, an example is illustrated in which the icon c1 is selected, and the menu m1 is displayed. The gadget 30a related to the icon c1 is accommodated in the expansion device 30z, so that a menu item used to accept a release instruction is included in the menu m1. The user may input a release instruction of the accommodation state through selection of the menu item.

The release request for the port a is transferred to the relay URL related to the port z (S803). Thus, the release request is transferred from the port z to the relay port of the relay server unit 34 of the expansion device 30z (S804). When the relay server unit 34 receives the release request through the relay port, the relay server unit 34 transfers the release request to the mediation unit 35 (S805). The mediation unit 35 identifies an expansion port corresponding to the relay port with reference to the port correspondence storage unit 38, and deletes correspondence information between the port number of the relay port and the port number of the expansion port, from the port correspondence storage unit 38 (S806). After that, the mediation unit 35 transfers the release request to the identified expansion port (S807). As a result, the release request is received by the expansion server unit 33.

The expansion server unit 33 executes cutting-off processing of communication with the gadget 30a, for the expansion port (S809). After that, the expansion server unit 33 sends a response indicating completion of the release back to the relay port (S810). After that, the relay server unit 34 transfers the response to the port z of the user terminal 10 (S811). The response is transferred to the port a (S812).

The API server unit 17 executes the coupling processing with the gadget 30a, based on the driver associated with the port a (S813). The detail of the processing of Step S813 is as described in FIG. 27. As a result, the user terminal 10 is coupled to the gadget 30a. After that, the API server unit 17 releases the setting used to cause the message for the port a to be transferred to the relay URL (S814). After that, the API server unit 17 returns the response indicating completion of the release, to the driver object a (S815). The response is returned to the Web application 13a (S816). The Web application 13a updates the display state of the icon c1, in response to the response (S817). For example, the display position of the icon c1 is returned to the position illustrated in FIG. 21.

As described above, the connection configurations between the user terminal 10, the gadget 30a, and the expansion device 30z is returned to the state described in (1) of FIG. 28.

As described above, in the embodiment, the gadget 30 coupled to the user terminal 10 may be accommodated in the expansion device 30z through an intuitive operation such as "drag-and-drop" of an icon. Thus, the operation load for changing a connection relationship (connection configuration) between the user terminal and the gadget 30 may be reduced.

In addition, in the state in which the connection configuration illustrated in (2) of FIG. 28 is achieved, when the user desires to take out the user terminal 10 and the gadget 30a, the connection state between the user terminal 10 and the gadget 30a may be returned easily by execution of the release operation.

A plurality of gadgets 30 may be accommodated in the expansion device 30z. In addition, a plurality of expansion devices may be coupled to the user terminal 10.

In addition, the expansion devices 30z may be hierarchically coupled to each other. That is, a certain expansion device may be accommodated in a further expansion device.

In addition, a change in the connection configuration may be automatically performed, based on a history of the previous change operation of the connection configuration. For example, in the state in which merely the gadget 30a is detected, the gadget 30a is coupled to the user terminal 10, and the processing illustrated in FIGS. 29, 30, and 31 may be automatically executed at the time of detection of the expansion device 30z.

In addition, when a certain user terminal 10 is coupled to the expansion device 30z that has been coupled to a further user terminal 10, whether the connection by the certain user terminal 10 is available may be selected in the further user terminal 10. When the connection is available, the gadget 30 accommodated in the expansion device 30z may be used by the certain user terminal 10.

In addition, cooperation between the gadget 30 and cloud service that provides a Backend as a Service (BaaS) function may be performed. That is, when an icon corresponding to the cloud service is displayed on the user terminal 10, and "drag-and-drop" of an icon of the gadget 30 including a sensor function is performed on the icon corresponding to the cloud service, statistics processing may be executed for a measurement value by the gadget 30 through the cloud service.

FIG. 36 is a diagram illustrating a cooperation example with cloud service that provides a BaaS function. In FIG. 36, (1) indicates the state in which icons c3 and c4 are displayed on the user terminal 10. The icon c3 is an icon corresponding to the gadget 30b that is a sensor for temperature. The icon c4 is an icon corresponding to the cloud service that provides the BaaS function that executes the statistics processing for a measurement value of temperature. That is, (1) corresponds to the state in which the gadget 30b is directly coupled to the user terminal 10. In such a state, when data display is instructed through a menu m2 displayed by an operation of the icon c3, a measurement value by the gadget 30b is displayed on an area a1 from moment to moment.

After that, as illustrated in (2), when "drag-and-drop" of the icon c3 is performed on the icon c4, the state illustrated in (3) is obtained. In the state illustrated in (3), the user terminal 10 stores information indicating that the gadget 30b is associated with the cloud service. However, the gadget 30b remains to be coupled to the user terminal 10. The user terminal 10 transfers the measurement value obtained from the gadget 30b, to the cloud service, based on the information. The user terminal 10 displays a result obtained by executing the statistics processing by the cloud service, on the area a1.

In addition, in the embodiments, a usage scene in a company is assumed, but the embodiments may be applied to personal usage. In this case, information related to the user terminal 10 may be stored in the allow list cache unit 121 and the gadget list cache unit 122 in advance without the cooperation management server 20. In this case, whether access to a gadget 30 by each of the Web applications 13 is available may be set by the user of the user terminal 10.

In the embodiment, the user terminal 10 is an example of an information processing device. The gadget 30a is an example of first external device. The expansion device 30z is an example of second external device. The API server unit 17 is an example of a connection unit. The Web application 13 is an example of a combination of a determination unit and a switching unit. The driver is an example of coupling information. The gadget information is an example of attribute information.

The embodiments of the technology discussed herein are described above in detail, but the technology discussed herein is not limited to such specific embodiments, and various modifications and changes may be made within the scope of the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method executed by an information processing apparatus, the communication method comprising:
    determining whether coupling of a second external device with a first external device is available based on attribute information on the first external device and attribute information on the second external device in a memory, each of the first external device and the second external device being coupled to the information processing apparatus through wireless communication respectively;
    cutting off coupling between the first external device and the information processing apparatus when it is determined that the coupling of the second external device with the first external device is available;
    modifying a part of a program stored in the memory based on information used for coupling between the first external device and the information processing apparatus; and
    transmitting the modified program to the second external device, the modified program being used for coupling with the first external device.

2. The communication method according to claim 1 further comprising:
    coupling the second external device with the first external device based on the transmitted modified program.

3. The communication method according to claim 1 further comprising:
    coupling, by the information processing apparatus, with each of a plurality of external devices through wireless communication using a program for coupling to each of the plurality of external devices through the wireless communication, the first external device and the second external device being included in the plurality of external devices.

4. The communication method according to claim 3 further comprising:
    displaying an icon associated with each of the plurality of external devices on a display; wherein
    the determining is executed when a certain operation related to an icon associated with the second external device is performed on an icon associated with the first external device.

5. The communication method according to claim 1 further comprising:
    receiving an encryption key from the second external device, and
    encrypting the modified program based on the encryption key before transmitting the modified program.

6. The communication method according to claim 1 further comprising:
    cutting off the coupling with the first external device when a certain operation is performed in a situation that the first external device is coupled to the second external device, and coupling the information processing device to the first external device using the modified program for the first external device.

7. An information processing apparatus comprising:
a memory; and
a processor coupled to the memory and configured to:
determining whether coupling of a second external device with a first external device is available based on attribute information on the first external device and attribute information on the second external device in the memory, each of the first external device and the second external device being coupled to the information processing apparatus through wireless communication respectively;
cut off coupling between the first external device and the information processing apparatus when it is determined that the coupling of the second external device with the first external device is available;
modify a part of a program stored in the memory based on information used for coupling between the first external device and the information processing apparatus; and
transmit the modified program to the second external device, the modified program being used for coupling with the first external device.

8. The communication method according to claim 7, wherein the processor configured to:
couple the second external device with the first external device based on the transmitted modified program.

9. The information processing apparatus according to claim 7, wherein the processor further configured to:
couple, by the information processing apparatus, with each of a plurality of external devices through wireless communication using a program for coupling to each of the plurality of external devices through the wireless communication, the first external device and the second external device being included in the plurality of external devices.

10. The information processing apparatus according to claim 9, wherein the processor further configured to display an icon associated with each of the plurality of external devices on a display; and
wherein the determining is executed when a certain operation related to an icon associated with the second external device is performed on an icon associated with the first external device.

11. The information processing apparatus according to claim 7, wherein the processor further configured to:
receive an encryption key from the second external device, and
encrypt the modified program based on the encryption key before transmitting the modified program.

12. The information processing apparatus according to claim 7, wherein the processor further configured to:
cut off the coupling with the first external device when a certain operation is performed in a situation that the first external device is coupled to the second external device, and coupling the information processing device to the first external device using the modified program for the first external device.

13. A non-transitory computer-readable recording medium storing a communication control program that causes an information processing apparatus to execute processing comprising:
determining whether coupling of a second external device with a first external device is available based on attribute information on the first external device and attribute information on the second external device in a memory, each of the first external device and the second external device being coupled to the information processing apparatus through wireless communication respectively;
cutting off coupling between the first external device and the information processing apparatus when it is determined that the coupling of the second external device with the first external device is available;
modifying a part of a program stored in the memory based on information used for coupling between the first external device and the information processing apparatus; and
transmitting the modified program to the second external device, the modified program being used for coupling with the first external device.

14. The non-transitory computer-readable recording medium according to claim 13, wherein the processing further comprises:
coupling the second external device with the first external device based on the transmitted modified program.

15. The non-transitory computer-readable recording medium according to claim 13, wherein the processing further comprises:
coupling, by the information processing apparatus, with each of a plurality of external devices through wireless communication using a program for coupling to each of the plurality of external devices through the wireless communication, the first external device and the second external device being included in the plurality of external devices.

16. The non-transitory computer-readable recording medium according to claim 15,
wherein the processing further comprises displaying an icon associated with each of the plurality of external devices on a display; wherein
the determining is executed when a certain operation related to an icon associated with the second external device is performed on an icon associated with the first external device.

17. The non-transitory computer-readable recording medium according to claim 13, wherein the processing further comprises:
receiving an encryption key from the second external device, and
encrypting the modified program based on the encryption key before transmitting the modified program.

18. The non-transitory computer-readable recording medium according to claim 13, wherein the processing further comprises:
cutting off the coupling with the first external device when a certain operation is performed in a situation that the first external device is coupled to the second external device, and coupling the information processing device to the first external device using the modified program for the first external device.

19. The communication method according to claim 1, wherein the program stored in the memory is a driver corresponding to the first external device.

* * * * *